US012375532B2

(12) United States Patent
Muravlyannikov et al.

(10) Patent No.: US 12,375,532 B2
(45) Date of Patent: *Jul. 29, 2025

(54) MEDIA FLOW CONTROL FOR DIRECT ROUTING IN NETWORK-BASED TELEPHONY

(71) Applicant: Microsoft Technology Licensing, LLC, Redmond, WA (US)

(72) Inventors: Nikolay Muravlyannikov, Redmond, WA (US); Mykhailo Uliutin, Redmond, WA (US); Maksim Golunov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,772

(22) Filed: Sep. 11, 2023

(65) Prior Publication Data

US 2023/0421617 A1 Dec. 28, 2023

Related U.S. Application Data

(63) Continuation of application No. 16/834,023, filed on Mar. 30, 2020, now Pat. No. 11,799,919.

(51) Int. Cl.
*H04L 65/1016* (2022.01)
*H04L 45/00* (2022.01)
*H04L 65/1069* (2022.01)
*H04L 65/1104* (2022.01)

(52) U.S. Cl.
CPC ......... *H04L 65/1016* (2013.01); *H04L 45/22* (2013.01); *H04L 65/1069* (2013.01); *H04L 65/1104* (2022.05)

(58) Field of Classification Search
None
See application file for complete search history.

(56) References Cited

U.S. PATENT DOCUMENTS

| | | | |
|---|---|---|---|
| 2012/0243549 A1* | 9/2012 | Lyons | H04L 45/306 370/410 |
| 2012/0294302 A1* | 11/2012 | Ku | H04M 7/0075 370/352 |
| 2014/0280720 A1 | 9/2014 | Bischoff | |
| 2018/0041641 A1* | 2/2018 | Shapira | H04L 67/14 |

OTHER PUBLICATIONS

Communication 94(3) Received for European Application No. 21709552.0, mailed on Apr. 24, 2024, 4 pages.

(Continued)

*Primary Examiner* — Ario Etienne
*Assistant Examiner* — Mohammad Yousuf A. Mian
(74) *Attorney, Agent, or Firm* — Schwegman Lundberg & Woessner, P.A.

(57) ABSTRACT

Disclosed in some examples are methods, systems, and machine-readable mediums that allow a network-based communication service to control a signaling path and media flow within non-public networks for direct-routed network-based communication sessions (e.g., telephony). The signaling and media flow may be controlled by using SIP protocol extensions to specify both the signaling route and the media route.

20 Claims, 17 Drawing Sheets

(56) References Cited

OTHER PUBLICATIONS

Communication under Rule 71 (3) EPC Received for European Patent Application No. 21709552.0, mailed on Mar. 5, 2025, 7 Pages.
Third Office Action Received for Chinese Application No. 202110247301.4, mailed on Mar. 31, 2025, 15 pages (English Translation Provided).
Communication under Rule 71 (3) EPC Received for European Patent Application No. 21709552.0, mailed on Apr. 9, 2025, 7 Pages.

\* cited by examiner

MEDIA FLOW CONTROL FOR DIRECT ROUTING IN NETWORK-BASED TELEPHONY

RELATED APPLICATION

This application is a continuation of U.S. patent application Ser. No. 16/834,023, filed on Mar. 30, 2020 and titled "Media Flow Control For Direct Routing In Network-Based Telephony", which application is incorporated herein by reference in its entirety.

TECHNICAL FIELD

Embodiments pertain to efficient routing of communication signaling and media through different networks.

BACKGROUND

Computing functions normally provided by private hardware and/or software are increasingly being provided as publicly available network-based services. Example networks include the Internet. These network-based services are often referred to as cloud-based services. To access these network-based services, computing devices of users connect over the network to computing resources in one or more datacenters that provide the network-based services. Network-based services are attractive to users and organizations as both the initial costs and the total costs of setting up and operating these services are typically lower due to resource-sharing and economies of scale.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
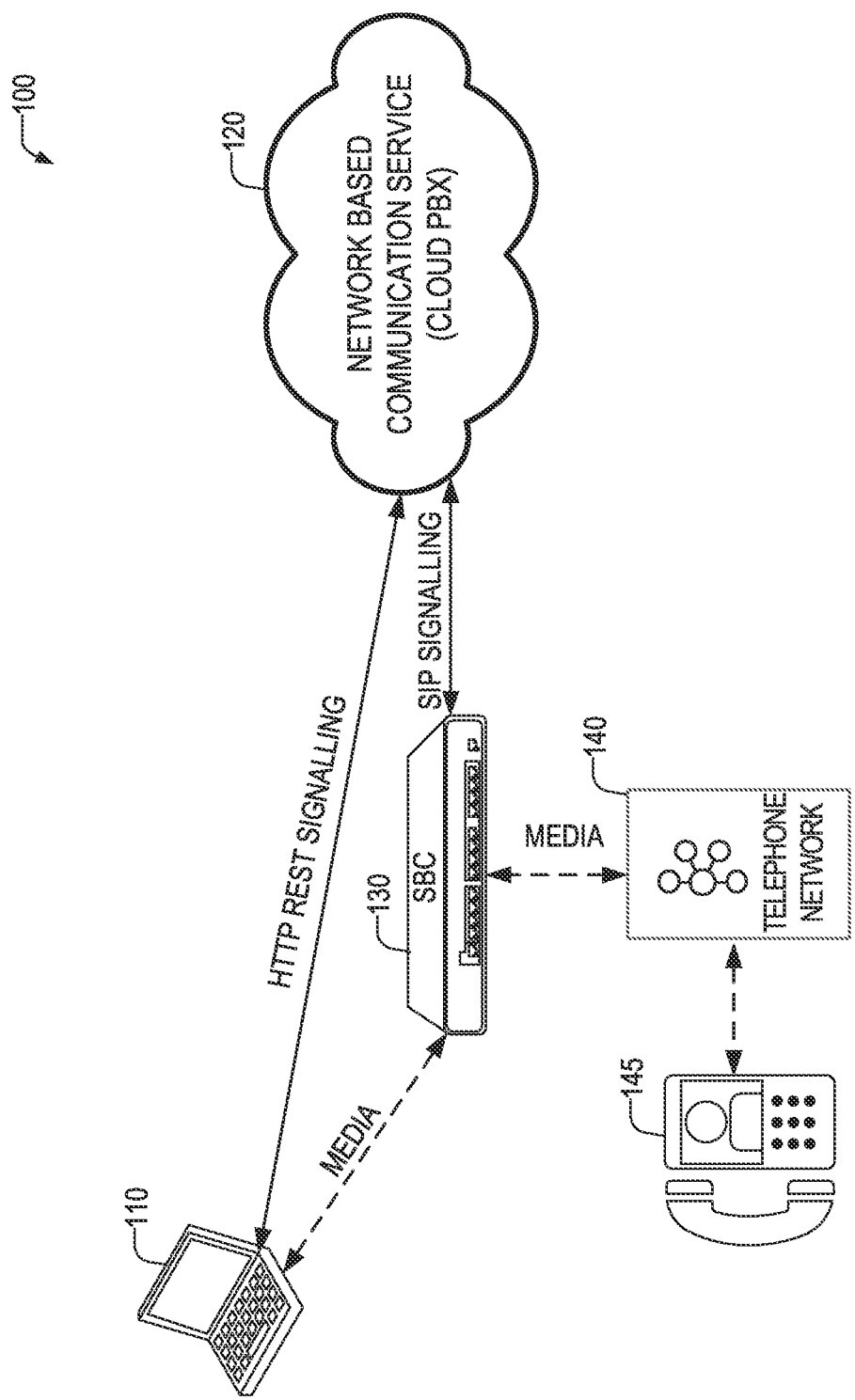
FIG. 1 illustrates a diagram of a basic direct routing scenario with media bypass of a communication session between a client computing device associated with a network-based communication service and a second device over a telephone network according to some examples of the present disclosure.

Communication services are also transitioning to network-based services. For example, telephony, online meetings, video sharing, screen sharing, and the like. These communication services are typically provided in a communication session which is established at a certain point in time to exchange media (such as audio, video, and the like) and then torn down at a later point in time. Network-based communication client applications on computing devices of users (either a dedicated application or through a browser) interface with the network-based communication service to manage sessions and media to allow users to make and receive phone calls and other communications with other client applications on other client devices. These communication sessions typically take place over a packet-switched network such as the Internet.

Network-based communication services may also allow users on the packet-switched network to make and receive phone calls with traditional telephones by interfacing with one or more telephone networks such as Public Switched Telephone Networks (PSTN). In these examples, the network-based communication service has hardware and/or software to connect with one or more telephone networks. The network-based communication service may translate a packet-based communication protocol such as SIP or HTTP used by the network-based communication client applications to protocols used by the telephone network (e.g., a protocol used by a PSTN—such as Signaling System No. 7 (SS7)). In some examples, the network-based communication service may also translate media from a format not supported by the telephone network (such as a PSTN) and used by the client applications to a format supported by the telephone network and back again.

Besides the aforementioned benefits of scale and resource sharing, the network-based communication services offer users the ability to communicate using the network-based service anywhere they have a connection to the network-based servers—which in many examples, will be anywhere they have an internet connection. Network-based communication services thus provide not only increased value in the centralization and management of the telephony equipment, but also in the flexibility to allow users to communicate from anywhere they have a network connection.

Some organizations want the flexibility of the network-based communication service; however, they may have agreements with a telephone carrier (such as a PSTN) which are more favorable to the organization than a network-based communication service can provide. In these examples, network-based communication services may provide a feature called direct routing. That is, client computing devices make calls by contacting servers of the network-based communication service (e.g., using a Hypertext Transfer Protocol Representational State Transfer (HTTP REST)). The network-based communication service initiates a signaling connection (usually using a Session Initiation Protocol (SIP)) with the organization's telephony equipment (typically a Session Border Controller (SBC)) which interfaces with the telephone network (e.g., PSTN) using the organization's agreements. Once the communication session is setup, the media may also travel through the network-based server which may process the media and send it to the organization's SBC which passes it along to the telephone network (PSTN). This ensures that users can still obtain the convenience of the network-based call service, but still uses the organization's preferred method of making and receiving calls.

As can be appreciated, sending the media across the Internet to the network-based communication service, only to send the media back to an organization's network may utilize additional network resources and may lead to increased latency. In some examples, once the communication is setup, rather than sending the media to the network-based communication service, the media may be sent directly from the client computing device to the organization's SBC. This is termed media bypass.

FIG. 1 illustrates a diagram 100 of a basic direct routing scenario with media bypass of a communication session between a client computing device 110 associated with a network-based communication service 120 and a second device 145 over a telephone network 140 according to some examples of the present disclosure. FIG. 1 shows the signaling and media flow for a communication between the client computing device 110 and a second device 145 over the telephone network 140. The second device 145 may be a telephone, computing device, or other device that is configured to establish a communication session over the telephone network 140. Client computing device 110 is a computing device (such as a desktop, laptop, smartphone, or the like) that executes a network-based communication service client application. Client computing device 110 exchanges messages (e.g., signaling messages) with the network-based communication service 120. In some examples, the signaling uses a REST architecture over a Hypertext Transfer Protocol (HTTP). The signaling may be call setup signaling, user presence signaling or the like. Based upon these signaling messages, the network-based communication service 120 exchanges SIP signaling messages with the SBC 130. Example SIP messages may include INVITE, RE-INVITE, OK, or other communication session setup, tear-down, or maintenance messages. SBC 130 exchanges any necessary signaling (not shown for clarity) with one or more devices of telephone network 140.

Traditionally, media generated by the client computing device 110 would flow from the client computing device 110 to the network-based communication service 120, to the SBC 130, to the telephone network 140 and to second device 145. Media generated by the second device would flow from the second device, to the telephone network 140, to the SBC 130, to the network-based communication service 120, to the client computing device 110.

In a bypass configuration, media flows directly between the client computing device 110 and the SBC 130. The SBC 130 then forwards this to the telephone network 140 and to the second device 145. During the call setup signaling, the client computing device 110 and the SBC provide IP addresses with which to establish a media session (e.g., such as a Real Time Protocol (RTP) session) and over which media associated with the communication session is sent. Media generated by the client computing device 110 is sent to the media IP address of the SBC 130 (and to the telephone network 140 and second device 145) and media generated by the second device 145 arrives at the SBC 130 over the telephone network 140 and is sent to the media address of the client computing device 110.

In many organizations, the SBC may be within a private network of the organization. Thus, media bypass directly to an organization's SBC requires the organization to open their firewall in their private network to allow traffic from any IP address (as user's may be anywhere in the world). If an organization is not comfortable opening their firewall up and allowing all connections to their SBC, the user's software application may default back to the traditional way of using the network-based communication service.

Media bypass is often preferred by organizations (e.g., businesses, groups, or other collections of individuals that setup a private network) to reduce latency and network resource usage. Despite this, in addition to the problem of opening up the SBC to outside traffic, various private network setups of these organizations also create issues. As used herein, an organizations private network refers to a private extranet or intranet that may be accessed only by authorized devices of the organization. These private networks allow for communication between these authorized devices and often utilize routing, protocols, and equipment similar to that of a publicly accessible networks such as the Internet.

Communications between devices inside the private network and devices outside the private network are possible, but tightly controlled by firewalls and other access restrictions. Private networks of organizations may be organized into a plurality of sites. As used herein, a site is a network subdivision. Each network site may be a particular network subnet, network segment, or portion of either a private or a public network and may correspond to a particular geographic area. For example, a site in Germany for a private network may have a subnet of 192.168.6.0/24 and a site in France for a private network may have a subnet of 192.168.7.0/24. A device on the Internet may be considered to be on a different network site than a device on the France site of the private network. In addition, while the private organizational network is connected to public networks, such as the Internet, they may be referred to herein as different networks and devices within the private network may be considered to be on a different site than devices on a public network (such as the Internet).

As noted previously, the organization may prefer that certain communication sessions utilize certain telephone network (e.g., PSTN) connections. These telephone network connections may be managed by an SBC in a particular network site. For example, an SBC in a network site in Germany may interface with a German telephone network and handle calls to/from German numbers. For security and other reasons, the organization may not want to make all of these SBCs publicly reachable from public networks. For those SBCs without publicly addressable IP addresses the network-based communication service may not be able to route the media and/or signaling through those SBCs and to their associated telephone networks.

Disclosed in some examples are methods, systems, and machine-readable mediums that allow a network-based communication service to control a signaling path and media flow within non-public networks for direct-routed network-based communication sessions (e.g., telephony). The signaling and media flow may be controlled by using SIP protocol extensions to specify both the signaling route and the media route.

When the communication session originates from the client computing device of the network-based communication service, the client computing devices communicate signaling information with the network-based communication service. The network-based communication service determines-based upon, for example, one or more of the phone number of the client computing device, the network location of the client computing device, or the phone number of the other party to the communication session—a primary SBC within the private network of the organization to handle the communication session. The network location may include whether the client computing device is in a public or private network and/or in what network site the client computing device is within.

For example, the primary SBC may be specified by a calling plan that specifies the SBC that interfaces with the preferred telephone network given the devices involved. If this primary SBC is not accessible to the network-based communication service, the network-based communication service determines a second SBC (called an intermediate SBC) that is both accessible to the network-based communication service and to the primary SBC (e.g., by the second SBC being in the private network, but accessible to the public network). In some examples, it may be said that the intermediate SBC is in both the private and public network. The network-based communication service exchanges signaling and session setup information (e.g., SIP signaling) with the intermediate SBC. The signaling and setup information informs the second SBC that the signaling should be forwarded to the primary SBC that is reachable by the second SBC but not the network-based communication service. For example, the primary SBC may be reachable via a private network connection between the first and second SBCs but may not have a public IP address and not reachable over a public network by the network-based communication service.

For calls originating via a telephone network, the primary SBC receives signaling related to the communication and is configured to forward it to an intermediate SBC. The network-based communication service determines the primary SBC from the signaling messages.

The network-based communication service determines a preferred media path and communications it via signaling information. The preferred media path may be determined based upon a network location of the primary SBC (including whether the network site is in a private or public network), a network location of the client computing device, and settings of the organization. The media may flow either directly between the primary SBC and the client computing device or between the primary SBC and the client computing device via the first SBC.

Figure 2:
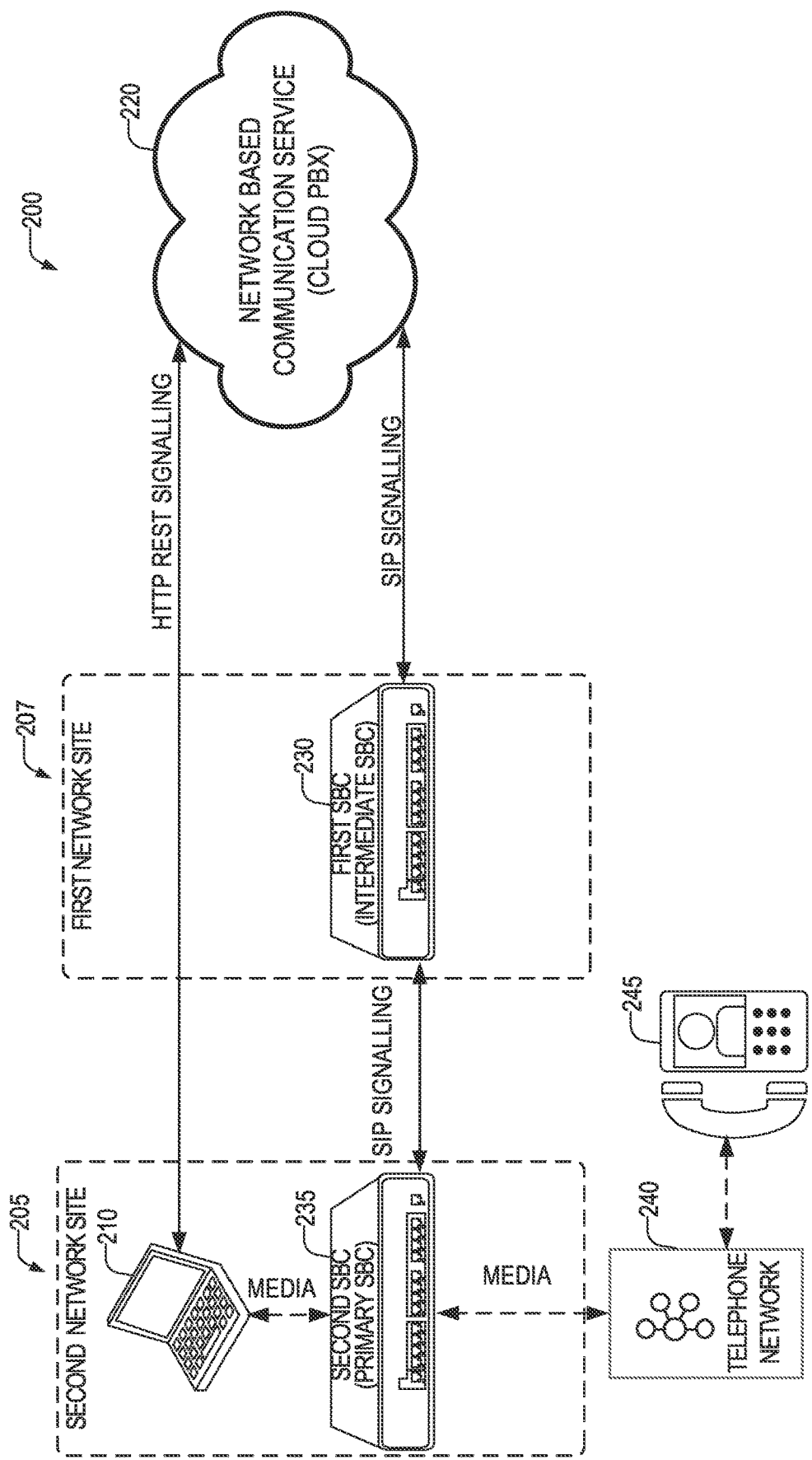
FIG. 2 illustrates a diagram of direct communication routing with media bypass and media flow control where the client computing device is located in a same network site as the primary SBC according to some examples of the present disclosure.

FIG. 2 illustrates a diagram 200 of direct call routing with media bypass and media flow control where the client computing device is located in a same network site as the primary SBC according to some examples of the present disclosure. As used herein, a primary SBC is an SBC that interfaces with the telephone network and an intermediate SBC forwards signaling and/or media from the network-based communication service to the primary SBC.

This figure illustrates signaling and media flow for a communication between the client computing device 210 and a second device 245 through the telephone network 240. First network site 207 and second network site 205 are different sites of a private network. Client computing device 210 exchanges signaling with the network-based communication service 220. In some examples, the signaling uses an HTTP REST architecture. This signaling may travel across one or more network sites of the private network to reach the network-based communication service 220 which is in a public network (e.g., the Internet). Client computing device 210 is located within (e.g., connected with and reachable in) the second network site 205. The signaling may be call setup signaling, user presence signaling or the like.

Network-based communication service 220 uses a network address of the client computing device 210 to determine that client computing device 210 is within the second network site 205. An administrator of the organization may provide one or more network address ranges that identify particular network sites. For communications originating with the client computing device, the network-based communication service 220 may determine where to route the signaling for completing the communication based upon one or more of the phone number of the client computing device, the network location of the client computing device, or a phone number of the other party to the communication session. In FIG. 2, it is determined that the signaling for the communication session is to be routed to the second SBC 235 (called the primary SBC) via first SBC 230 (an intermediate SBC) in a first network site 207.

The network-based communication service 220 then sends SIP messaging to first SBC 230 with instructions (e.g., in the form of SIP protocol extensions) informing the first SBC 230 to forward the SIP signaling to the second SBC 235. In some examples, the signaling is simply forwarded by the first SBC 230, but in other examples, the first SBC 230 terminates the SIP session with the network-based communication service 220 and establishes a concurrent session with the second SBC 235. The second SBC 235 then exchanges any necessary signaling (not shown for clarity) with one or more devices of telephone network 240.

For calls originating with a device associated with the telephone network, the SBC which receives the call from the telephone network takes the role of the primary SBC. In FIG. 2, this is second SBC 235. The organization configures one or more intermediate SBCs for each of the primary SBCs. The second SBC 235 notifies the network-based communication service 220 of the communication (based upon the phone number of the client computing device 210 being associated with the network-based communication service 220) via the assigned intermediate SBC (first SBC 230). The network-based communication service 220 then identifies the primary and intermediate SBCs based upon this signaling sent by the intermediate SBC.

During the call setup signaling, the client computing device 210 is provided an IP address to send outgoing media to and likewise the client computing device 210 provides an IP address that will receive incoming media to the primary SBC. The media address provided to the client computing device 210 depends on the reachability of the second SBC 235 to client computing device 210 as well as settings of the private network. In the example of FIG. 2, since the client computing device is within a same private network site as the second SBC 235, the media is directly sent to the second SBC 235 from the client computing device 210. Second SBC 235 then forwards the media to the telephone network 240 which forwards the media to the second device 245. Likewise, media from the second device 245 is sent to the second SBC 235 over the telephone network 240 which forwards it to the client computing device.

Figure 3:
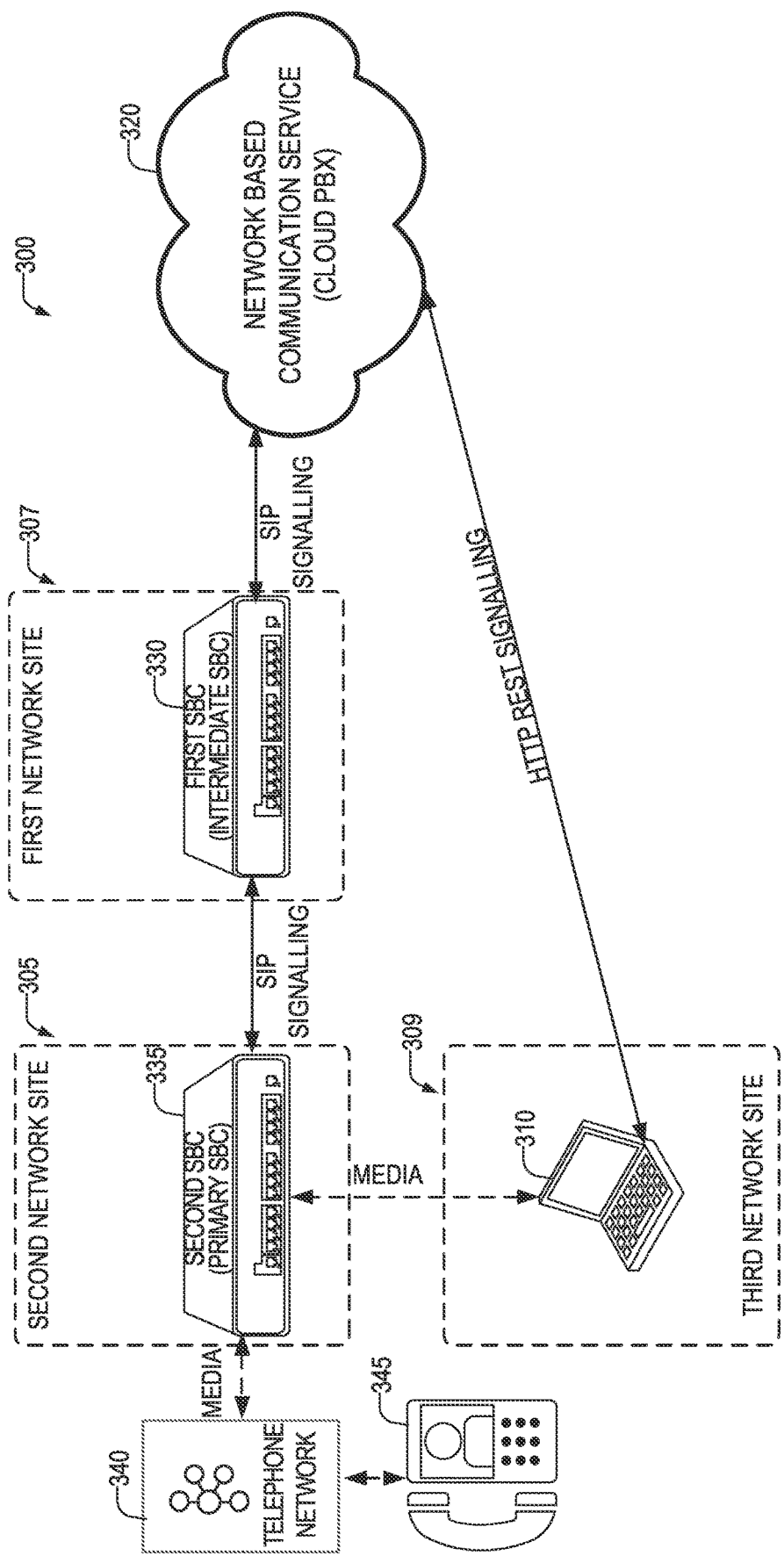
FIG. 3 illustrates a diagram of direct communication routing with media bypass and media flow control where the client computing device is located in a different network site than the primary SBC according to some examples of the present disclosure.

FIG. 3 illustrates a diagram 300 of direct call routing with media bypass and media flow control where the client computing device is located in a different private network site than the primary SBC according to some examples of the present disclosure. The figure illustrates signaling and media flow for a communication between the client computing device 310 and a second device 345 over the telephone network 340. First network site 307, second network site 305, and third network site 309 are different sites of a private network. Client computing device 310 exchanges signaling with the network-based communication service 320. In some examples, the signaling uses a HTTP REST architecture. This signaling may travel across one or more private network sites owned by the organization to reach the network-based communication service 320. Client computing device 310 is located within (e.g., connected with and reachable in) a third network site 309. The signaling may be call setup signaling, user presence signaling or the like.

Network-based communication service 320 uses a network address of the client computing device 310 to determine that client computing device 310 is within the third network site 309. For example, the network-based communication service may utilize a network address of the client computing device 310 identified during the signaling. An administrator of the organization may provide one or more network address ranges that identify particular private network sites. For communications originating with the client computing device, the network-based communication service 320 may determine where to route the signaling for completing the communication based upon one or more of the phone number of the client computing device, the network location of the client computing device, or a phone number of the other party to the communication session. In FIG. 3, it is determined that the signaling for the communication session is to be routed to the second SBC 335 (called the primary SBC) via first SBC 330 (an intermediate SBC) in a first network site 307.

The network-based communication service 320 then sends SIP messaging to the first SBC 330 with instructions (e.g., protocol extensions) informing the first SBC 330 to forward the SIP signaling to the second SBC 335. In some examples, the signaling is forwarded by the first SBC 330, but in other examples, the first SBC 330 terminates the SIP session with the network-based communication service 320 and establishes a concurrent session with the second SBC 335. The second SBC 335 then exchanges any necessary signaling (not shown for clarity) with one or more devices of telephone network 340.

For incoming calls, the SBC which receives the call from the telephone network takes the role of the primary SBC and the organization configures intermediate SBCs for each of the primary SBCs. In FIG. 3, the primary SBC is the second SBC 335 and the intermediate SBC is first SBC 330. The second SBC 335 notifies the network-based communication service 320 of the communication via first SBC 330. The second SBC 335 knows that the client computing device 310 is associated with the network-based communication service based upon the phone number of the client computing device 310 being associated with the network-based communication service 320. The network-based communication service 320 then identifies the primary and intermediate SBCs based upon this signaling sent by first SBC 330.

During the call setup signaling, the client computing device 310 is provided an IP address to send outgoing media to and likewise the client computing device 310 provides an IP address that will receive incoming media to the second SBC 335. The media address provided to the client computing device 310 depends on the reachability of the second SBC 335 to client computing device 310 as well as settings of the private network. In the example of FIG. 3, while the client computing device 310 is not within the same private network site, the client computing device 310 is still within the private network and thus the second SBC 335 may be reachable (e.g., addressable) by the client computing device 310. In FIG. 3, the media settings of the private network allow a direct connection between devices in the third network site 309 and the second network site 305. In these examples, the network-based communication service 320 provides the network address (e.g., an internal or external IP address) of the second SBC 335 to the client computing device 310. Client computing device 310 sends media directly to the second SBC 335. SBC 335 then forwards the media to the telephone network 340 which delivers it to second device 345. Likewise, media from the second device 345 is sent to the primary SBC which forwards it to the client computing device.

Figure 4:
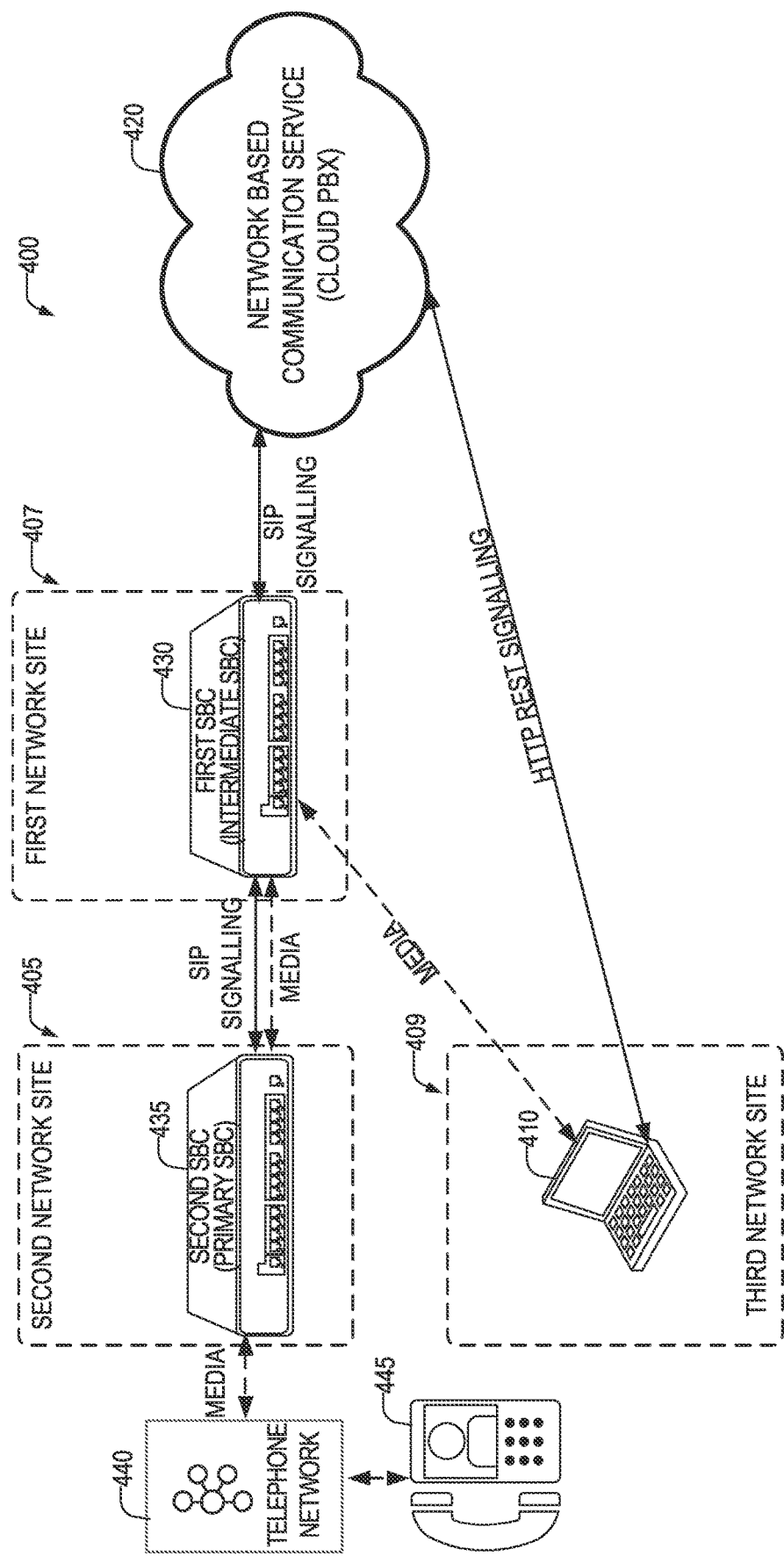
FIG. 4 illustrates a diagram of direct communication routing with media bypass and media flow control where the client computing device is located in a different network site than the primary SBC and the primary SBC is either not reachable or media settings of the private network do not allow media bypass according to some examples of the present disclosure.

FIG. 4 illustrates a diagram 400 of direct call routing with media bypass and media flow control where the client computing device is located in a different network site than the primary SBC and the primary SBC is either not reachable or media settings of the private network do not allow media bypass according to some examples of the present disclosure. The figure illustrates signaling and media flow for a communication between the client computing device 410 and a second device 445 connected to the telephone network 440. First network site 407, second network site 405, and third network site 409 are different sites of a private network. Client computing device 410 exchanges signaling with the network-based communication service 420. In some examples, the signaling uses a HTTP REST architecture. This signaling may travel across one or more network sites owned by the organization. Client computing device 410 is located within (e.g., connected with and reachable in) a third network site 409. The signaling may be call setup signaling, user presence signaling or the like.

Network-based communication service 420 uses a network address of the client computing device 410 to determine that client computing device 410 is within the second network site 405. An administrator of the organization may provide one or more network address ranges that identify particular private network sites. For communications originating with the client computing device, the network-based communication service 420 may determine where to route the signaling for completing the communication based upon one or more of the phone number of the client computing device, the network location of the client computing device, or a phone number of the other party to the communication session. In FIG. 4, it is determined that the signaling for the communication session is to be routed to the second SBC 435 (called the primary SBC) via first SBC 430 (an intermediate SBC) in a first network site 407.

The network-based communication service 420 then sends SIP messaging to the first SBC 430 with instructions (e.g., in the form of SIP protocol extensions) informing the first SBC 430 to forward the SIP signaling to the second SBC 435. In some examples, the signaling is forwarded, but in other examples, the first SBC 430 terminates the SIP session with the communication service 420 and establishes a concurrent session with the second SBC 435. SBC 435 then exchanges any necessary signaling (not shown for clarity) with one or more devices of telephone network 440.

For incoming calls, the SBC which receives the call from the telephone network takes the role of the primary SBC and the organization configures intermediate SBCs for each of the primary SBCs. In FIG. 4, the primary is the second SBC 435 and the intermediate SBC is the first SBC 430. The second SBC 435 notifies the network-based communication service 420 of the communication (based upon the phone number of the client computing device 410 being associated with the network-based communication service 420) via the first SBC 430. The network-based communication service 420 then identifies the primary and intermediate SBCs based upon this signaling sent by the intermediate SBC.

During the call setup signaling, the client computing device 410 is provided an IP address to send outgoing media to and likewise the client computing device 410 provides an IP address that will receive incoming media to the second SBC 435. The media address provided to the client computing device 410 depends on the reachability of the second SBC 435 to client computing device 410 as well as organizational settings.

In the example of FIG. 4, the second SBC 435 is either not reachable by the client computing device 410 or media settings do not allow the bypass connection between the two private network sites. In these examples, the network-based communication service 420 provides the network address (e.g., an internal or external IP address) of the first SBC 430 to the client computing device 410. Client computing device 410 sends media to the first SBC 430 (e.g., over a public network), who forwards it to the second SBC 435. Second SBC 435 then forwards the media to the telephone network 440 which forwards it to the second device 445. Likewise, media from the second device 445 is sent to the second SBC 435 which forwards it to the first SBC 430, which forwards it to the client computing device 410.

Figure 5:
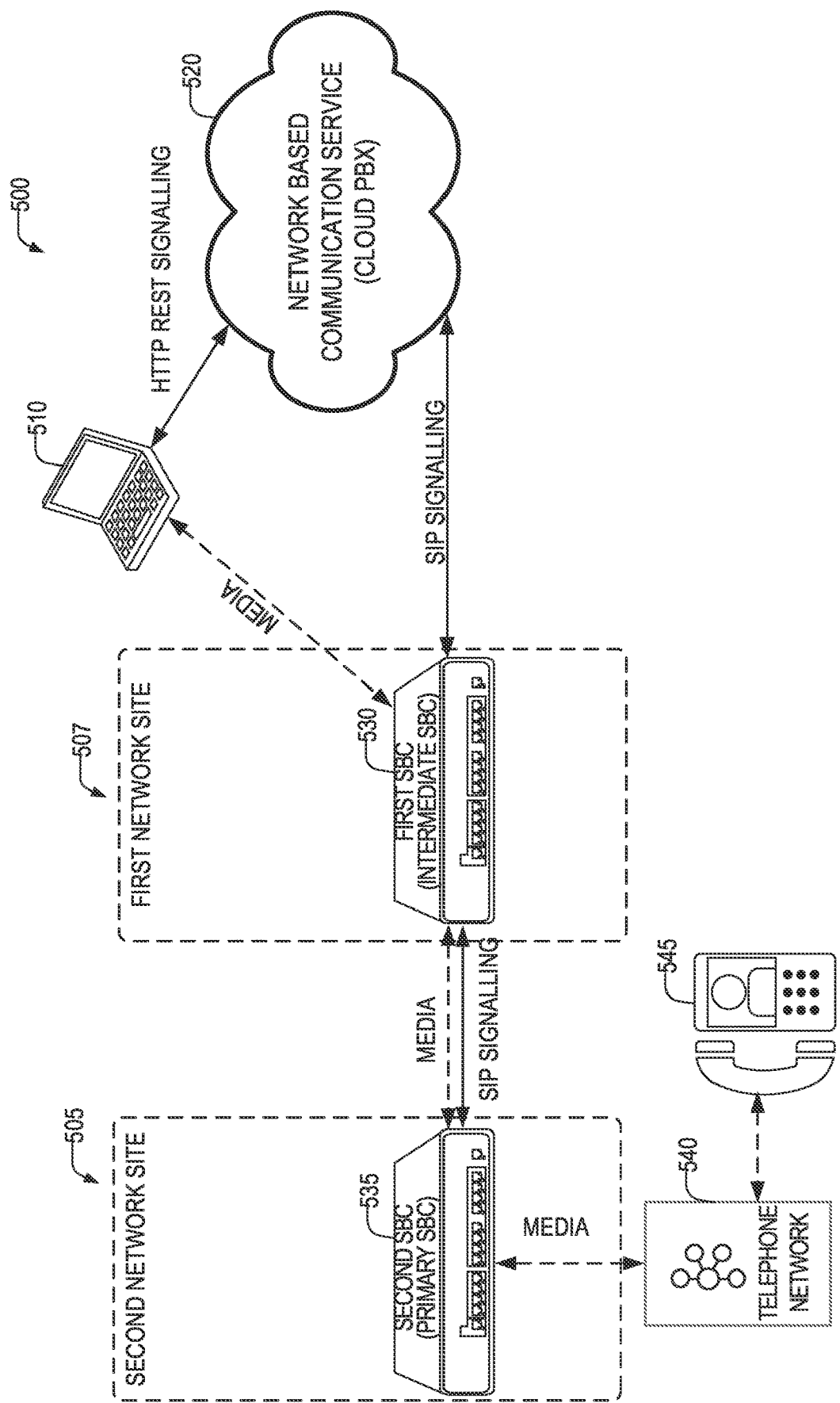
FIG. 5 illustrates a diagram of direct call routing with media bypass and media flow control where the client computing device is located on a network site outside the private network according to some examples of the present disclosure.

FIG. 5 illustrates a diagram 500 of direct call routing with media bypass and media flow control where the client computing device is located on a network site outside the private network of the organization according to some examples of the present disclosure. The figure illustrates signaling and media flow for a communication between the client computing device 510 and a second device 545 connected to the telephone network 540. First network site 507 and second network site 505 are different sites of a private network. Client computing device 510 is on a public network and exchanges signaling with the network-based communication service 520. In some examples, the signaling uses a HTTP REST architecture. Client computing device 510 is not located within (e.g., connected with and reachable in) a network site of the private network of the organization, but is within a public network site. The signaling may be call setup signaling, user presence signaling or the like.

Network-based communication service 520 uses a network address of the client computing device 510 to determine that client computing device 510 is not within a network site of the private network of the organization. An administrator of the organization may provide one or more network address ranges that identify particular private network sites of the organization. If the client computing device's IP address is not within a designated site, the network-based communication service 520 determines that the client computing device 510 is external to the organization. For example, on the public Internet. For communications originating with the client computing device, the network-based communication service 220 may determine where to route the signaling for completing the communication based upon one or more of the phone number of the client computing device, the network location of the client computing device, or a phone number of the other party to the communication session. In FIG. 5, it is determined that the signaling for the communication session is to be routed to the second SBC 535 (called the primary SBC) via first SBC 530 (an intermediate SBC) in a first network site 507.

The network-based communication service 520 then sends SIP messaging to the first SBC 530 with instructions (e.g., protocol extensions) informing the first SBC 530 in a first network site 507 to forward the SIP signaling to the second SBC 535. In some examples, the signaling is forwarded, but in other examples, the first SBC 530 terminates the SIP session with the network-based communication service 520 and establishes a concurrent session with the second SBC 535. The second SBC 535 then exchanges any necessary signaling (not shown for clarity) with one or more devices of telephone network 540.

For incoming calls, the SBC which receives the call from the telephone network takes the role of the primary SBC and the organization configures intermediate SBCs for each of the primary SBCs. In FIG. 5 the primary SBC is the second SBC 535 and the intermediate SBC is the first SBC 530. The second SBC 535 notifies the network-based communication service 520 of the communication (based upon the phone number of the client computing device 510 being associated with the network-based communication service 520) via the first SBC 530. The network-based communication service 520 then identifies the primary and intermediate SBCs based upon this signaling sent by the intermediate SBC.

During the call setup signaling, the client computing device 510 is provided an IP address to send outgoing media to and likewise the client computing device 510 provides an IP address that will receive incoming media to the second SBC 535. The media address provided to the client computing device 510 depends on the reachability of the second SBC 535 to client computing device 510 as well as organizational settings. In the example of FIG. 5, the second SBC 535 is either not reachable by the client computing device 510 or media settings do not allow the direct connection. In these examples, the network-based communication service 520 provides the network address (e.g., an internal or external IP address) of the first SBC 530 to the client computing device 510. Client computing device 510 sends media to the first SBC 530, who forwards it to the second SBC 535. Second SBC 535 then forwards the media to the telephone network 540 which forwards it to the second device 545. Likewise, media from the second device 545 is sent to the second SBC 535 which forwards it to the first SBC 530, which forwards it to the client computing device 510.

Media sent by the client computing device may include media captured by a microphone of the client computing device, media captured by a video camera of the client computing device, screen sharing data of the client computing device, previously recorded media stored by the client computing device, or the like. Likewise, media sent to the client computing device may include media captured by a microphone of the second device, media captured by a video camera of the second device, screen sharing data of the second device, previously recorded media of the second device, or the like As noted above, the organization's private network media settings may impact the route media takes during a communication session. In particular, a media path mode setting may determine the media path of a particular communication. A first mode is an "always bypass" mode. In this mode, if the client computing device is on the private network of the organization, media will be sent to media address provided by the primary SBC. This is shown in FIGS. 2 and 3. If the client computing device is on an external site (e.g., a public network), media is sent to the intermediate SBC and then forwarded to the primary SBC (e.g., sent to the primary SBC). This is shown in FIG. 5. A second mode is "OnlyForLocalUsers" which means that if the client computing device is in a same private network site of the organization as the primary SBC, media will be sent directly to the primary SBC. This is shown in FIG. 2. In this mode, if the client computing device is either in a different private network site of the organization, or an external network site (e.g., a public network), media is sent to the intermediate SBC and then forwarded to the primary SBC. This is shown in FIGS. 4 and 5.

To set a media path optimization mode, in some examples, an administrator enters a command to set a flag in each SBC in the private network. That is, the media path optimization mode may be specific to each SBC and specific to network sites. Thus, in some examples, if the administrator of the private network believes that the internal connection between two different network sites is strong enough, the administrator may set the media path optimization to "always bypass." If the administrator feels that the internal connection between two other sites is less strong, the administrator may set the media path optimization to "OnlyForLocalUsers." These settings may be communicated to the network-based communication service.

For example, consider a company that has a centralized SBC in an Amsterdam network site. This SBC serves 30 countries and has good connectivity between all these 30 network sites and local users of the organization. Also, there is a branch in Hungary where a local SBC is deployed. In this case the SBCs in Hungary can configured in "Always Bypass" mode for all other private network sites. Regardless of the location of the client computing device within the private network, the computing devices can connect to the SBC directly (for example from Germany to Hungary). On the other hand, if the Hungarian site does not have a good connection with the German location, the administrator can use the flag "OnlyForLocalUsers" for that connection. The media flows via the Amsterdam SBC if the user happens to be in Germany when connecting to the Hungarian SBC.

As noted, when using one SBC as an intermediate for another SBC, the intermediate SBC is informed of the primary SBC of the signaling and the media path through signaling messages. On example method of informing the intermediate SBC is through SIP protocol extensions. These extensions are added by the network-based communication service to SIP Invites and Re-Invite messages for calls originating with the client computing devices and 200 OK messages for calls originating from the telephone network. The first extension (e.g., X-MS-UserLocation) specifies whether the client computing device is located on a private network of the organization or an external network. There are two possible values that are represented—one is "internal" the other is "external." The Request-URI for the invite and re-invite messages are overloaded to include the fully qualified domain name (FQD) of the primary SBC even if the SBC is not directly connected to the network-based communication service. The intermediate SBC knows from the FQD to forward the message to the primary SBC. The next extension is an indication of an order of SBC that should be used for the media path (X-MS-MediaPath). The third extension is an identification of the user's home private network site as defined by the organization's administrator (X-MS-UserSite).

Figure 6:
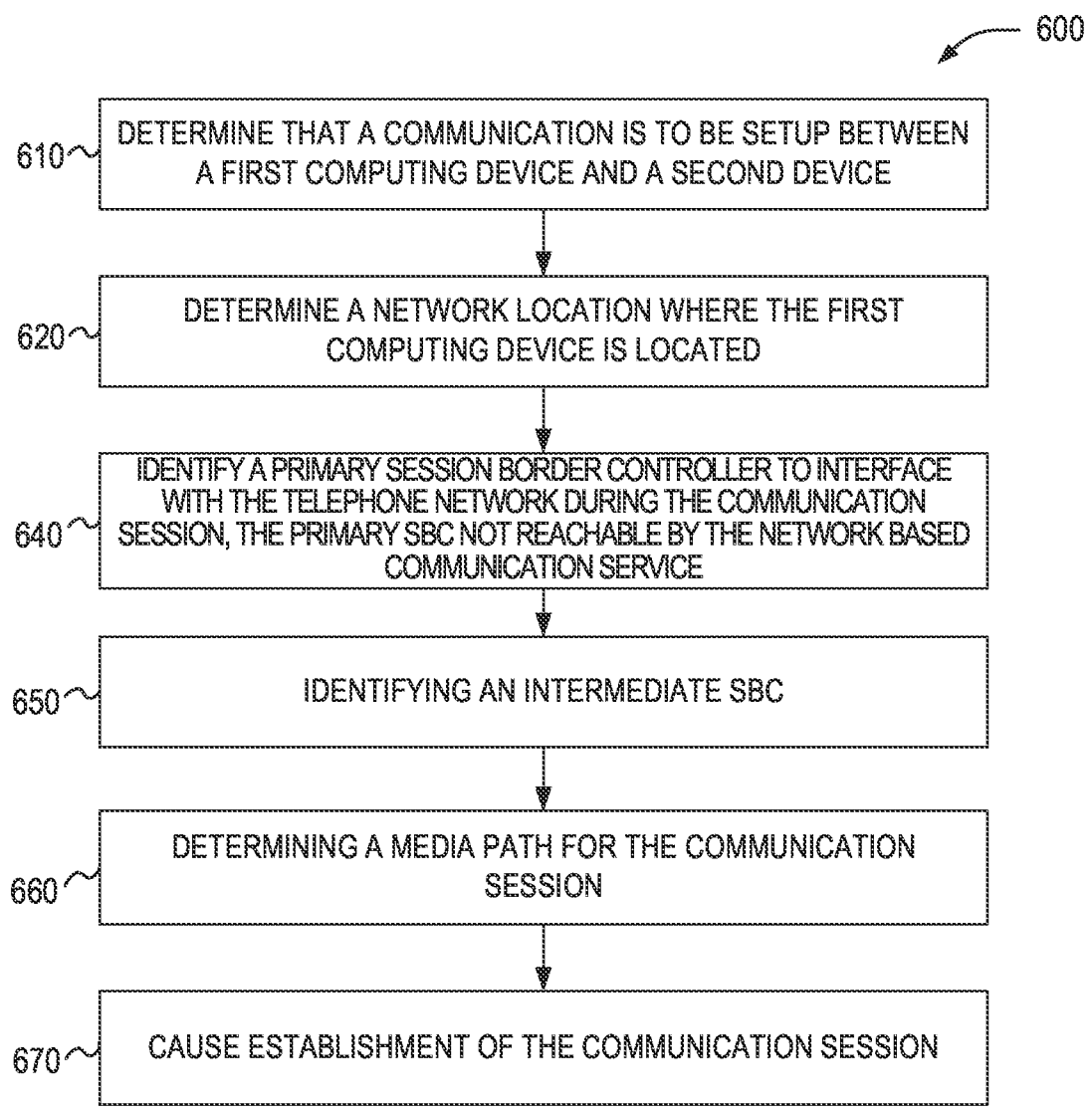
FIG. 6 illustrates a method performed by a network-based communication service according to some examples of the present disclosure.

FIG. 6 illustrates a method 600 performed by a network-based communication service according to some examples of the present disclosure. At operation 610 the network-based communication service may determine that a communication is to be setup between a first computing device (a client computing device) executing a client application of the network-based communication service and a second device, the communication session routed partially over a telephone network. The first computing device may be associated with the network-based communication service such that communications for that device are routed to the network-based communication service. Determining that the communication is to be set up may be based upon one or more signaling messages. In some examples, this may be a communication initiated by the first computing device—e.g., an outgoing call. That is, the first computing device may send a request to the network-based communication service to initiate the communication. In other examples, this may be determined based upon a message received from an SBC indicating that the second device is attempting to setup a communication session with the first computing device—e.g., an incoming call. For example, the network-based communication service may receive a SIP INVITE message for the phone number associated with the first computing device.

At operation 620 the network-based communication service may determine a network location where the first computing device is located. As previously noted, the network location may include a network site and/or whether the first computing device is within an organization's private network or whether the first computing device is within a public network. For example, the network site may be determined based upon a network address such as an IP address of the first computing device. In some examples, the network site may be in a first network or a second network. For example, a first network such as the Internet or a second network—such as an organization's private network. The network-based communication service may store records that indicate sites within an organization's private network and IP address ranges that belong to those sites. If the IP address of the first computing device is within one of those locations, the network site is identified as a private network site based upon the IP address. If the IP address of the first computing device is not within one of those locations, the location is an external site to the organization.

At operation 640, the network-based communication service may identify a primary session border controller to interface with the telephone network during the communication session, the primary SBC not reachable directly by the network-based communication service. That is, the primary SBC may not be setup to accept connections from the network-based communication service. For example, the first SBC is not reachable over a first network (e.g., the Internet). As an example, the primary SBC may not have an address in the first network (e.g., a publicly routable IP address), but instead may have an organization specific address in a second network. In other examples, a firewall may prevent connections to the primary SBC. For inbound calls to the first computing device, the primary SBC may be identified based upon the invite message sent by an intermediate SBC that is reachable by the network-based communication service.

For outbound calls from the first computing device to the second device, the primary SBC may be selected by the network-based communication service based upon the network location of the first computing device, a phone number of the first computing device and the phone number of the second device. For example, a call policy specified by an administrator of the organization may specify a signaling route for particular combinations of network sites and phone number. An example row of a call policy for the network of FIG. 2 when client computing device 210 is one of the calling parties (with a phone number of +84 4 5555 5555) and the phone number of the second device is +84 4 3926 3000:

| User network site | User make or receive a call to/from number | User phone number | Communication Routing Policy |
|---|---|---|---|
| Second Site | +84 4 3926 3000 | +84 4 5555 5555 | Priority 1: called_party_ phone_number- firstsbc.exampledomain.com |

By first selecting all the rows with matching network sites of the first computing device determined at operation 620, then selecting, from those results, the row that matches both the second device phone number and the first computing device phone number, the communication routing policy may be returned. There may be multiple routes listed with an indication as to which to try first. For example, priority 1 routes are tried first. If the communication cannot be setup on that route, then priority 2 routes are tried, and so on. The communication routing policy includes a SIP address that contains the called parties phone number and the fully qualified domain name of the primary SBC.

By allowing for granular control of which SBCs handle the communication session based upon the user network location, the user's network address, and the second device's phone number, the system may allow for greater flexibility in allowing the organization to specify the correct primary SBCs (and thus the correct telephone network connection) to most optimally handle communication sessions as an organization may have contracts with multiple telephone networks that may have different fee arrangements depending on the calling party and the called party. For example, a telephone network (e.g., PSTN) in Vietnam may charge less for handling communication sessions for local numbers than another telephone may charge for those numbers. Thus, the organization may wish to route those calls to the Vietnamese telephone network by routing them to a particular SBC that terminates the connection with the telephone network.

At operation 650, the network-based communication service may identify an intermediate SBC as the primary SBC may not be reachable by the network-based communication service. That is, the primary SBC is not reachable by the network-based communication service e.g., it is not reachable over a first network—such as the Internet—on which the network-based communication service resides. For example, the primary SBC may not have a publicly addressable IP address. Instead the primary SBC may have an IP address that is internal to an organization (e.g., a private network or Intranet) and/or the organization's private network structure may not permit outsiders to access this address. For inbound calls, the intermediate SBC may be identified in the SIP invite message sent by the intermediate SBC. For outgoing calls, prespecified network configurations allow identification of an intermediate SBC that is addressable to the network-based communication service and is also capable of addressing the primary SBC (e.g., over a second network such as the organization's private network). In some examples, the intermediate SBC is reachable over the first network by the network-based communication service and the primary SBC is reachable by the intermediate SBC over a second network (e.g., a private network).

At operation 660 a media path for the communication session is determined. The determination may be made based upon one or more of the network location of the first computing device, the primary SBC (and in particular the network site of the primary SBC), or a media mode of the primary SBC. For example, the following table may be utilized:

| Network site of the First computing device relative to the primary SBC | Routing Policy | MEDIA ROUTE |
|---|---|---|
| First computing device on a same network site as the primary SBC | ALWAYS BYPASS | Direct route between media address given by the first computing device and media address of primary SBC |
| First computing device on a same network site as the primary SBC | ONLY FOR LOCAL USERS | Direct route between media address given by the first computing device and media address of primary SBC |

-continued

| Network site of the First computing device relative to the primary SBC | Routing Policy | MEDIA ROUTE |
|---|---|---|
| First computing device on a different network site (but internal to the organization) as the primary SBC | ALWAYS BYPASS | Direct route between media address given by the first computing device and media address of primary SBC |
| First computing device on a different network site (but internal to the organization) as the primary SBC | ONLY FOR LOCAL USERS | Indirect route between media address of first computing device, media address of intermediate SBC and media address of primary SBC |
| First computing device on an external network site. | ALWAYS BYPASS | Indirect route between media address of first computing device, media address of intermediate SBC and media address of primary SBC |
| First computing device on an external network site. | ONLY FOR LOCAL USERS | Indirect route between media address of first computing device, media address of intermediate SBC and media address of primary SBC |

At operation 670, the network-based communication service may cause establishment of the communication session by transmitting one or more signaling messages between the network-based communication service and the first SBC through the second SBC, the signaling instructing the first and second SBCs to use the determined media path. For example, for outbound calls, the network-based communication service may send a SIP invite request to the intermediate SBC with the second device's phone number with an additional tag indicating a fully qualified domain name of the primary SBC—for example, "+18338006777@sbc1.domain.com." This instructs the intermediate SBC that the intermediate SBC is to act as a relay and send the SIP signaling to the primary SBC (SBC1).

Additionally, the SIP invite may include one or more protocol extensions to specify whether the first computing device is internal or external to the organization's network; the media path of the media; and a site that the user is currently connected to. In other examples, for inbound calls, the SIP message OK may include the network site of the first computing device, the media path, and a network address to send media to the first computing device.

Figure 7:
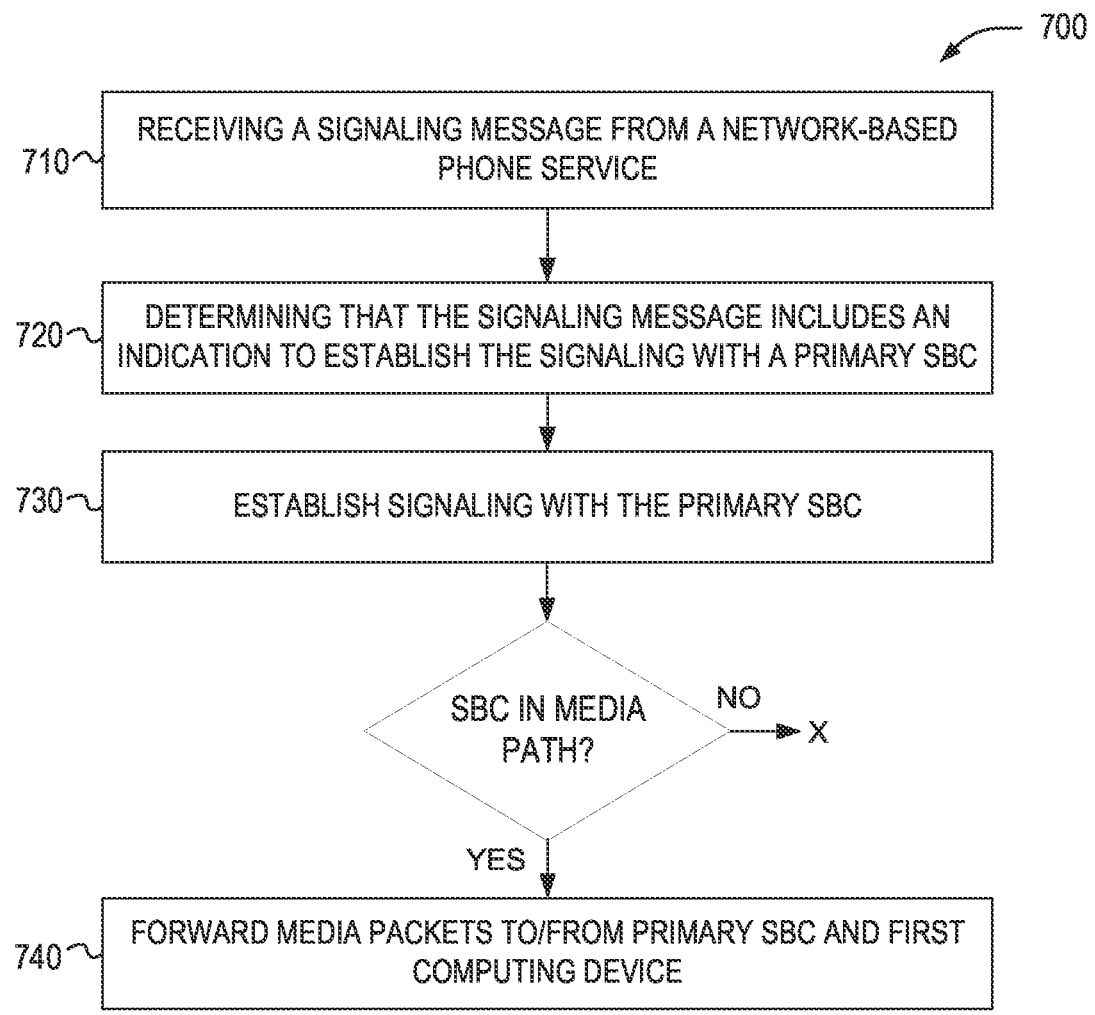
FIG. 7 illustrates a flowchart of a method of an intermediate SBC handling a communication session originated by a first computing device associated with the network-based communication service and to a second device through a telephone network connected to the primary SBC according to some examples of the present disclosure.

FIG. 7 illustrates a flowchart of a method 700 of an intermediate SBC handling a communication session originated by a first computing device associated with the network-based communication service and to a second device through a telephone network connected to the primary SBC according to some examples of the present disclosure. At operation 710 the SBC may receive a signaling message from a network-based communication service. The signaling message may be a request to setup a communication session between a first computing device associated with the network-based communication service and a second device. In some examples, the signaling message may be a SIP invite message. The SIP invite message may include a phone number of the first computing device (e.g., phone number), an identifier of a primary SBC that is to process the communication session, an indication of whether the first computing device is within a same network as the SBC, a media path, an identifier of a network site of the first computing device and a media address of the first computing device.

At operation 720 the SBC may determine that the signaling message includes an indication to establish signaling with a primary SBC. That is, the SBC is communicating with a primary SBC on behalf of the network-based communication service. At operation 730 the SBC may establish signaling with the primary SBC. This may comprise forwarding the signaling between the network-based communication service and the primary SBC, including the message received at operation 710. In other examples, the SBC may setup a first signaling session (e.g., a SIP session) between the SBC and the network-based communication service and a second separate signaling session (e.g., a SIP session) between the SBC and the primary SBC. Messages received from the second SBC on the second signaling session are sent to the network-based communication service over the first signaling session and messages received from the network-based communication service over the first signaling session are sent to the primary SBC over the second signaling session. If the SBC is in the media path, then a media session is established with the first computing device and the second SBC. At operation 740 the SBC may forward media packets between the primary SBC and the first computing device.

In some examples, communications between the SBC and the network-based communication service may be over a different network or network portion than communications between the SBC and the primary SBC. For example, the communications between the SBC and the network-based communication service may be over the Internet (to an external network site), whereas communications between the SBC and the primary SBC may be within an organization's private network (an internal network site). In some examples, the communications between the SBC and the network-based communication service may utilize Internet accessible IP addresses. In some examples, the communications between the SBC and the primary SBC may be over an intranet or other private network and may involve private network addresses such as private IP addresses. That is, the SBC may have both a public, internet accessible IP address, and a network address on the private network. The public, internet accessible IP address is used with communications to the network-based communication service and the private network address (e.g., private IP address) may be used with communications between devices within the private network (such as communications between the primary SBC and the SBC).

Figure 8:
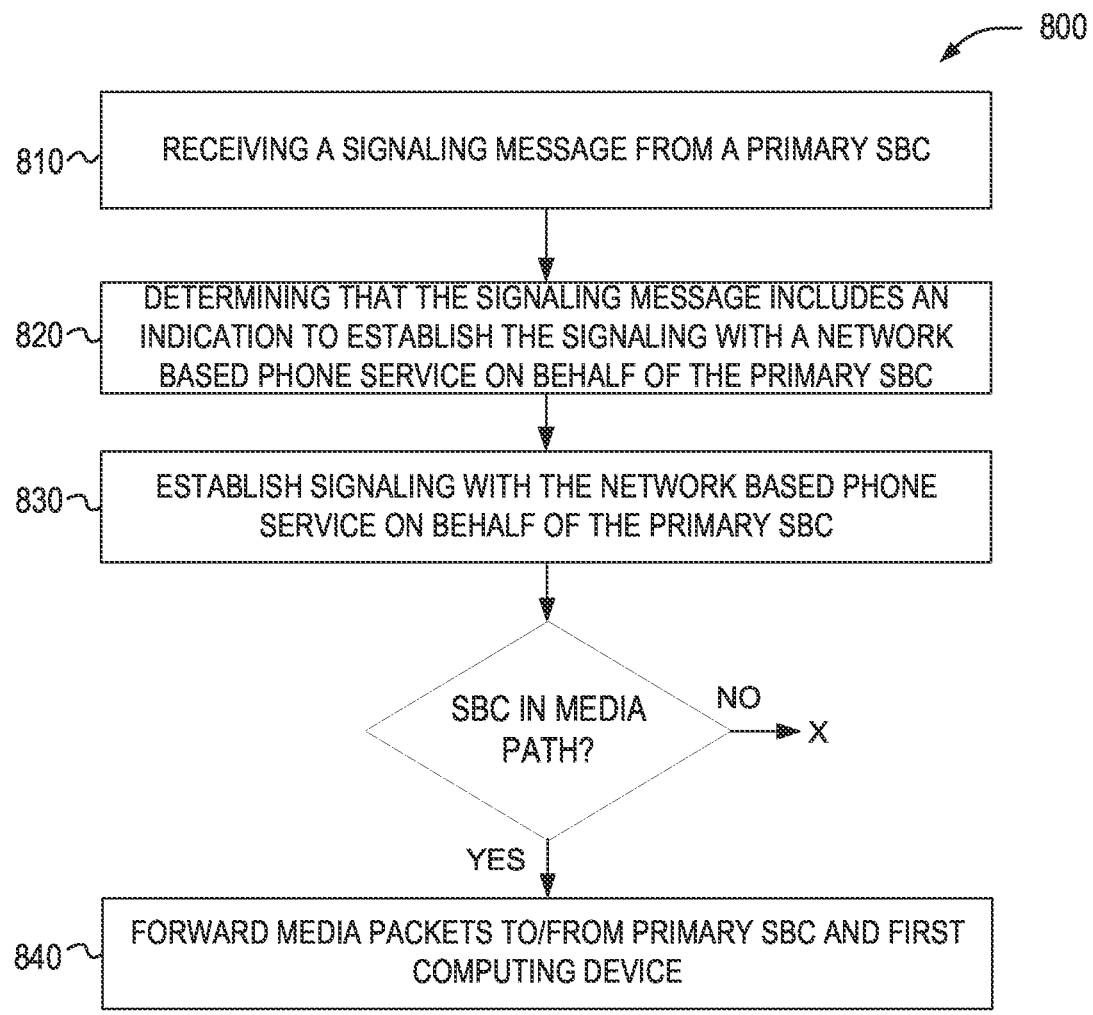
FIG. 8 illustrates a flowchart of a method of an intermediate SBC handling a communication session originated by a second device through a telephone network associated with a primary SBC and to a first computing device associated with a network-based communication service according to some examples of the present disclosure.

FIG. 8 illustrates a flowchart of a method 800 of an intermediate SBC handling a communication session originated by a second device through a telephone network (e.g., PSTN) associated with a primary SBC and to a first computing device associated with a network-based communication service according to some examples of the present disclosure. At operation 810 the intermediate SBC may receive a signaling message from a primary SBC. For example, a SIP INVITE message with a phone number of the first computing device. The invite may also include a domain name of the primary SBC and a media address to send media to. The primary SBC may indicate that the signaling message is for the first computing device and that the first computing device is associated with the network-based communication service. In other examples, the intermediate SBC may determine from the phone number of the first computing device that was received with the signaling message at operation 810 and from one or more location registers or other databases that the first computing device is associated with the network-based communication service.

At operation 820, the intermediate SBC may determine that the signaling message includes an indication to establish a signaling connection with a network-based communication service on behalf of the primary SBC. The intermediate SBC may be configured to act as the intermediate SBC on communication sessions between one or more primary SBCs and the network-based communication service. For example, an administrator of the organization may indicate that particular SBCs are to act as intermediate SBCs for other SBCs (primary SBCs) for communication sessions involving computing devices associated with the network-based communication service. These settings may be stored in a setting data structure on one or more SBCs (e.g., intermediate SBCs and/or primary SBCs).

At operation 830, the SBC may establish a signaling connection with the network-based communication service on behalf of the second SBC. As previously noted, this may involve simply forwarding the messages or may involve two separate signaling sessions. If the intermediate SBC is part of the media path, then at operation 840 the intermediate SBC forwards media packets to and from the second SBC and the first computing device.

Figure 9:
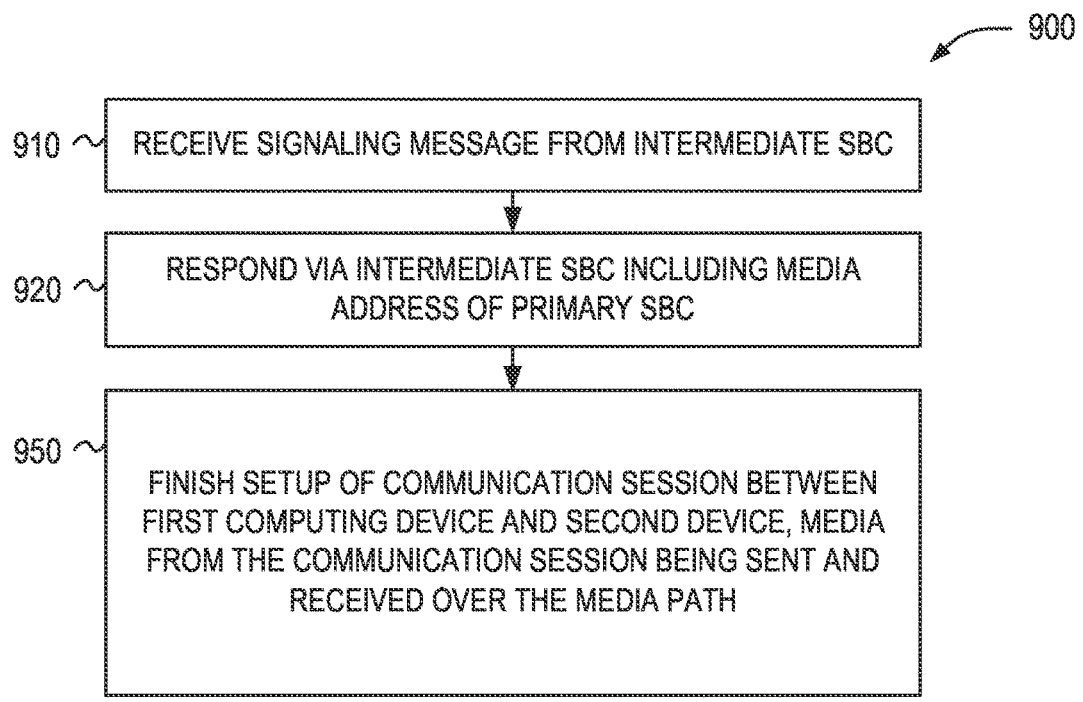
FIG. 9 illustrates a flowchart of a method of a primary SBC handling a communication session originated by a first computing device associated with the network-based communication service and to a second device through a telephone network connected to the primary SBC according to some examples of the present disclosure.

FIG. 9 illustrates a flowchart of a method 900 of a primary SBC handling a communication session originated by a first computing device associated with the network-based communication service and to a second device through a telephone network (e.g., PSTN) connected to the primary SBC according to some examples of the present disclosure. At operation 910, the primary SBC receives a signaling message from an intermediate SBC. For example, the intermediate SBC may be passing signaling messages from a network-based communication service to the primary SBC. The signaling message may be a SIP invite message including a phone number of the caller (first computing device) and a media address of the caller. The primary SBC may contact the telephone network and forward the communication session request to the called device over the telephone network. Once a response is received from the telephone network, at operation 920, the primary SBC may respond to the network-based communication service via the intermediate SBC. For example, by transmitting a SIP message confirming the connection (e.g., a 200 OK or a 180 Ringing message) to the second SBC, which then retransmits that message to the network-based communication service. The SBC may provide a media address to the network-based communication service within the response. At operation 950 the SBC may finish establishing the communication session between the first computing device and the second device. Media from the communication session being sent and received over the media path.

Figure 10:
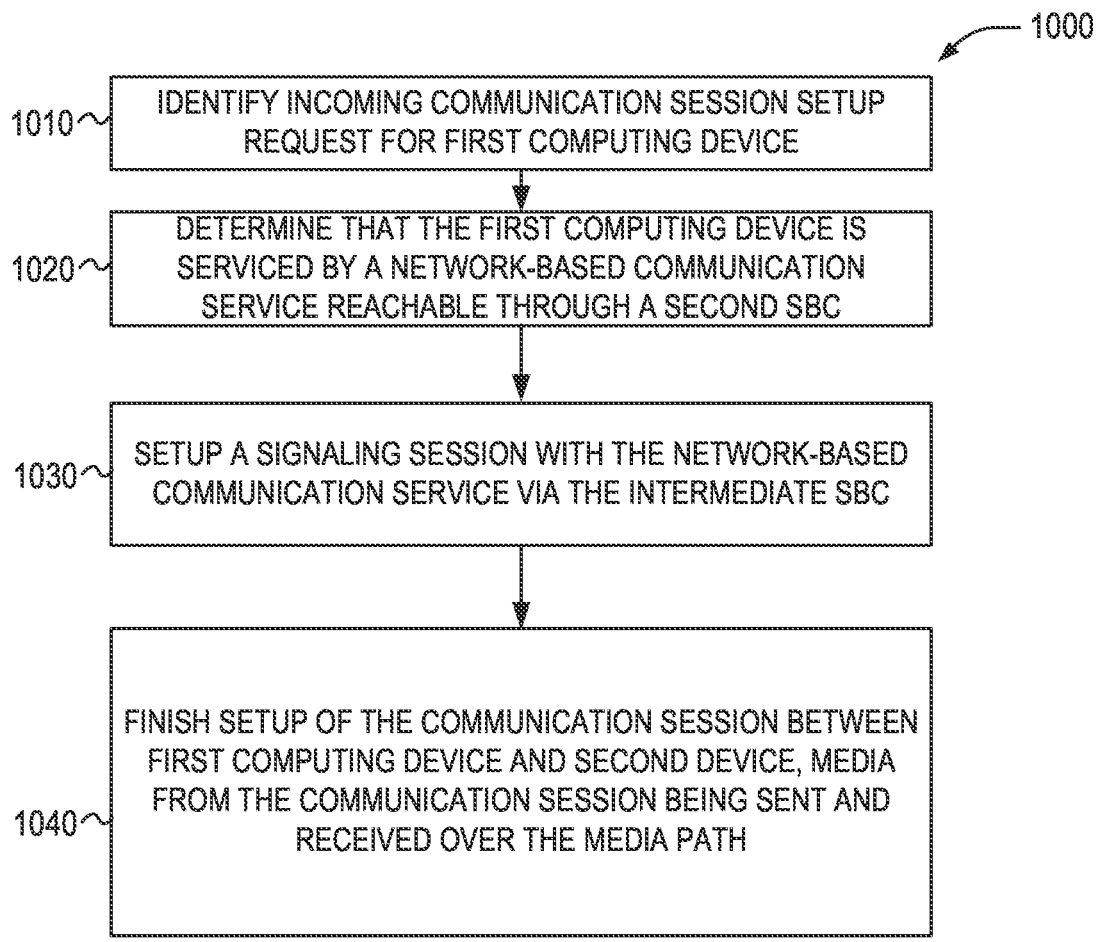
FIG. 10 illustrates a flowchart of a method of a primary SBC handling a communication session originated by a second device through a telephone network and to a first computing device associated with a network-based communication service according to some examples of the present disclosure.

FIG. 10 illustrates a flowchart of a method 1000 of a primary SBC handling a communication session originated by a second device through a telephone network and to a first computing device associated with a network-based communication service according to some examples of the present disclosure. At operation 1010, the remote SBC identifies an incoming communication session setup request for a first computing device. For example, a message may be received over a telephone network indicating that a communication session is desired between a second device on the telephone network and the first computing device serviced by the network-based communication service.

At operation 1020, the primary SBC may determine that the first computing device is serviced by a network-based communication service that is not reachable by this SBC but may be reached by an intermediate SBC. For example, the primary SBC may have access to a list of phone numbers associated with the network-based communication service. Based upon the phone number of the first computing device, the primary SBC may determine that the phone number is associated with the network-based communication service. Additionally, the primary SBC may be configured to forward communication session setup and signaling for client computing devices of the network-based communication service to a particular intermediate device by one or more SBC settings.

At operation 1030 the primary SBC may setup a signaling connection between the primary SBC and the network-based communication service via the intermediate SBC. For example, the primary SBC may send a SIP invite message with a "from" field set to the second device's phone number with a domain name of the primary SBC appended to the end. Additionally, the primary SBC may provide a media address to the network-based communication service through the intermediate SBC. The media address may be provided in one or more signaling messages sent to the network-based communication service via the intermediate SBC.

At operation 1040 the communication session may be established between the first computing device and the second device. Media from the communication session may be sent over the media path, which includes the primary SBC. In some examples, where the first computing device is on a same network site as the primary SBC, the first computing device may directly send the media to the primary SBC. In other examples, where the first computing device is external to the organization's private network, the first computing device may send media to the intermediate SBC which may forward the media to the primary SBC. In yet other examples, where the first computing device is within a different network site of the organization's private network than the primary SBC, whether the media is sent directly to the primary SBC or sent via the intermediate SBC depends on the settings of the primary and/or intermediate SBC.

Figure 11:
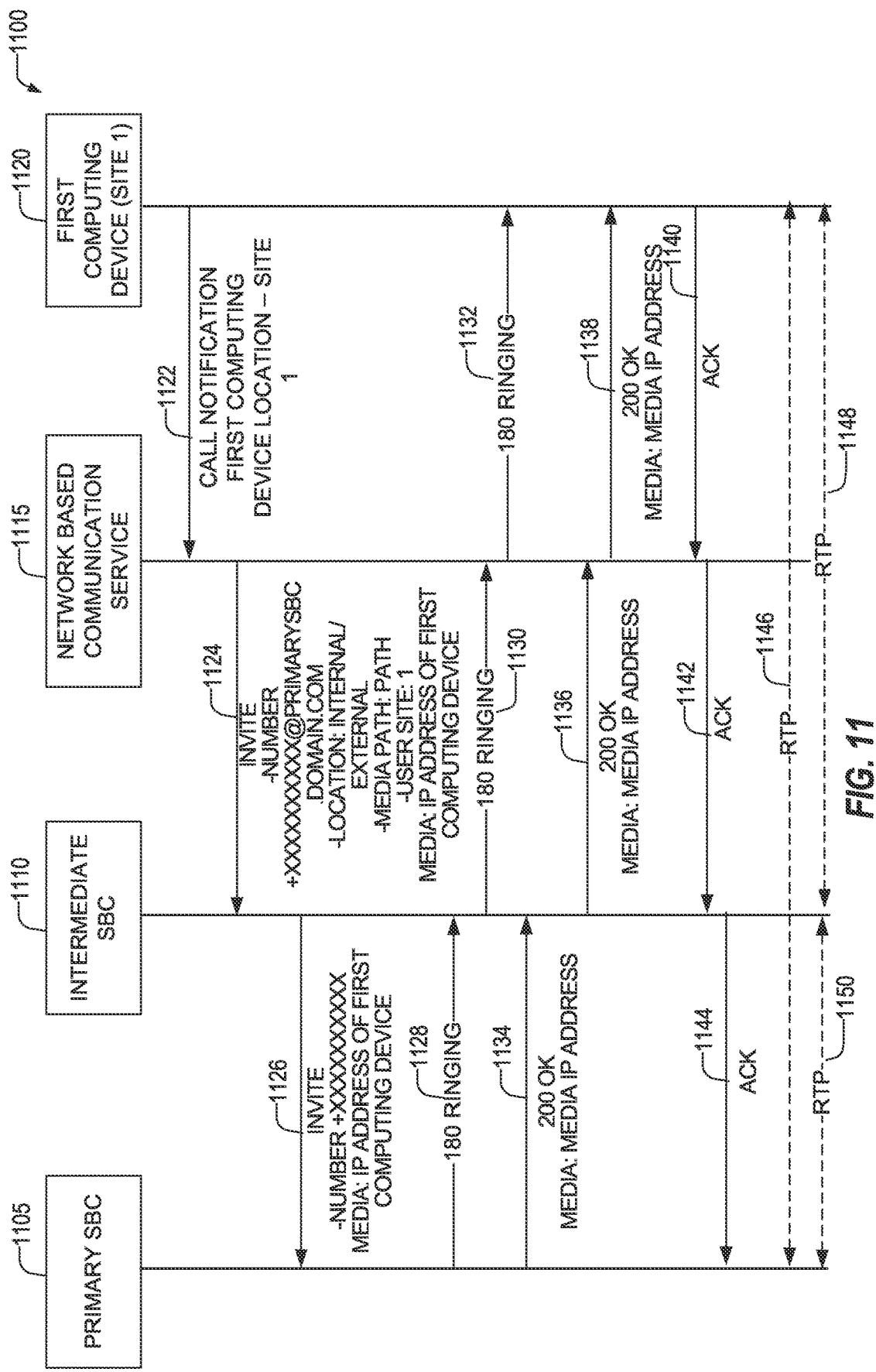
FIG. 11 illustrates a diagram of a SIP message flow for a communication session initiated by a first computing device associated with the network-based communication service to a second device through a telephone network according to some examples of the present disclosure.

FIG. 11 illustrates a diagram of a SIP message flow 1100 for a communication session initiated by a first computing device 1120 associated with the network-based communication service 1115 to a second device through a telephone network according to some examples of the present disclosure. First computing device 1120 is in a first network site (either within the private network of an organization or external to the private network in a public network) and sends a call notification message 1122 (e.g., over a HTTP REST protocol) to the network-based communication service 1115 with the location of the first computing device indicated as site 1 (e.g., either via an explicit indication in the message or the user's location is determinable via an IP address). The network-based communication service 1115 then determines a primary SBC to handle the communication based upon the phone number of the first computing device, the location of the first computing device, the phone number of the called device (e.g., second device) and a call policy of the organizational network. The network-based communication service 1115 may identify the organizational network based upon the phone number of the first computing device 1120 as belonging to the organization and may retrieve the call policy from a database.

In the example of FIG. 11, the primary SBC 1105 is chosen. The network-based communication service 1115 may determine that the primary SBC 1105 is not directly reachable. For example, the primary SBC 1105 may be located on a second network that is different than a first network which the network-based communication service 1115 is located. Where the first computing device 1120 is in a private network site of the organization, the first computing device 1120 also includes a connection to the public network. The network-based communication service 1115 may consult configuration settings for communications into the organization's network to determine that primary SBC 1105 is reachable via intermediate SBC 1110. The network-based communication service 1115 then sends a SIP Invite message 1124 to the intermediate SBC 1110. The SIP invite message 1124 may include the phone number of the second device (the called party), whether the first computing device 1120 is located on a network that is internal or external to the organization of the SBC, a media path, a user network site, and a media address of the first computing device 1120. For example, these fields may be sent as protocol extensions. The network-based communication service may determine the media path based upon the network site of the first computing device (including whether the first computing device is on a network site internal or external to the organization), the primary SBC (and in particular the network site of the primary SBC), and a media mode of the primary SBC. In some examples, the domain address of the primary SBC is included as part of the phone number of the second device. For example, +1234567890@primarysbc.domain.com.

Intermediate SBC 1110 receives the SIP invite message 1124 and determines from the message (e.g., the phone number of the second device with the domain name of primarysbc.domain.com) that the message is for primary SBC 1105. The intermediate SBC 1110 sends the SIP invite to the primary SBC 1105. In some examples, the invite 1126 may not include all the fields included in the SIP invite 1124. For example, the domain address of the primary SBC 1105 may be stripped from the phone number of the called party, and the location, media path, and user site may not be included in the SIP INVITE.

Primary SBC 1105 responds with a SIP 180 Ringing message, which is forwarded 1130 by intermediate SBC 1110 to the network-based communication service 1115. In some examples, this may then be relayed to the first computing device 1120 using message 1132.

When the user answers, the primary SBC 1105 sends a 200 OK message 1134 with the media address of the primary SBC 1105 to the intermediate SBC 1110. Intermediate SBC 1110 sends a 200 OK message 1136 with the media IP address of the Primary SBC 1105 to the network-based communication service 1115. Network-based communication service 1115 may send a 200 OK message 1138 with the media address of the primary SBC 1105 to the first computing device 1120. Ack messages 1140, 1142, and 1144 are then sent from the first computing device 1120 to the primary SBC 1105 through both the network-based communication service 1115 and intermediate SBC 1110.

A Real Time Transfer Protocol (RTP) session may then be established to transfer the media during the communication session. In examples in which the first computing device 1120 is in a same private network site as (e.g., local to) the primary SBC 1105, the RTP session 1146 may be used which is a direct connection to the primary SBC 1105. In examples in which the first computing device 1120 is not in a same private network site as the Primary SBC 1105 but within the organization's private network, and the organization has a media path setting allowing bypass always mode, the RTP session 1146 may be used which is a direct connection to the primary SBC 1105. In examples in which the first computing device 1120 is not in a same private network site as the primary SBC 1105 but within the organization's private network, and the organization has a media path setting requiring local only mode, the RTP sessions 1148 and 1150 may be used which sends media to the intermediate SBC 1110 which then forwards it to the primary SBC 1105. In examples in which the first computing device 1120 is in an external network site to the organization's private network the RTP sessions 1148 and 1150 may be used which sends media to the intermediate SBC 1110 which then forwards it to the primary SBC 1105. In some examples two different RTP sessions are opened (e.g., a first session 1148 and a second session 1150), but in other examples, the intermediate SBC 1110 merely forwards the RTP messages.

Figure 12:
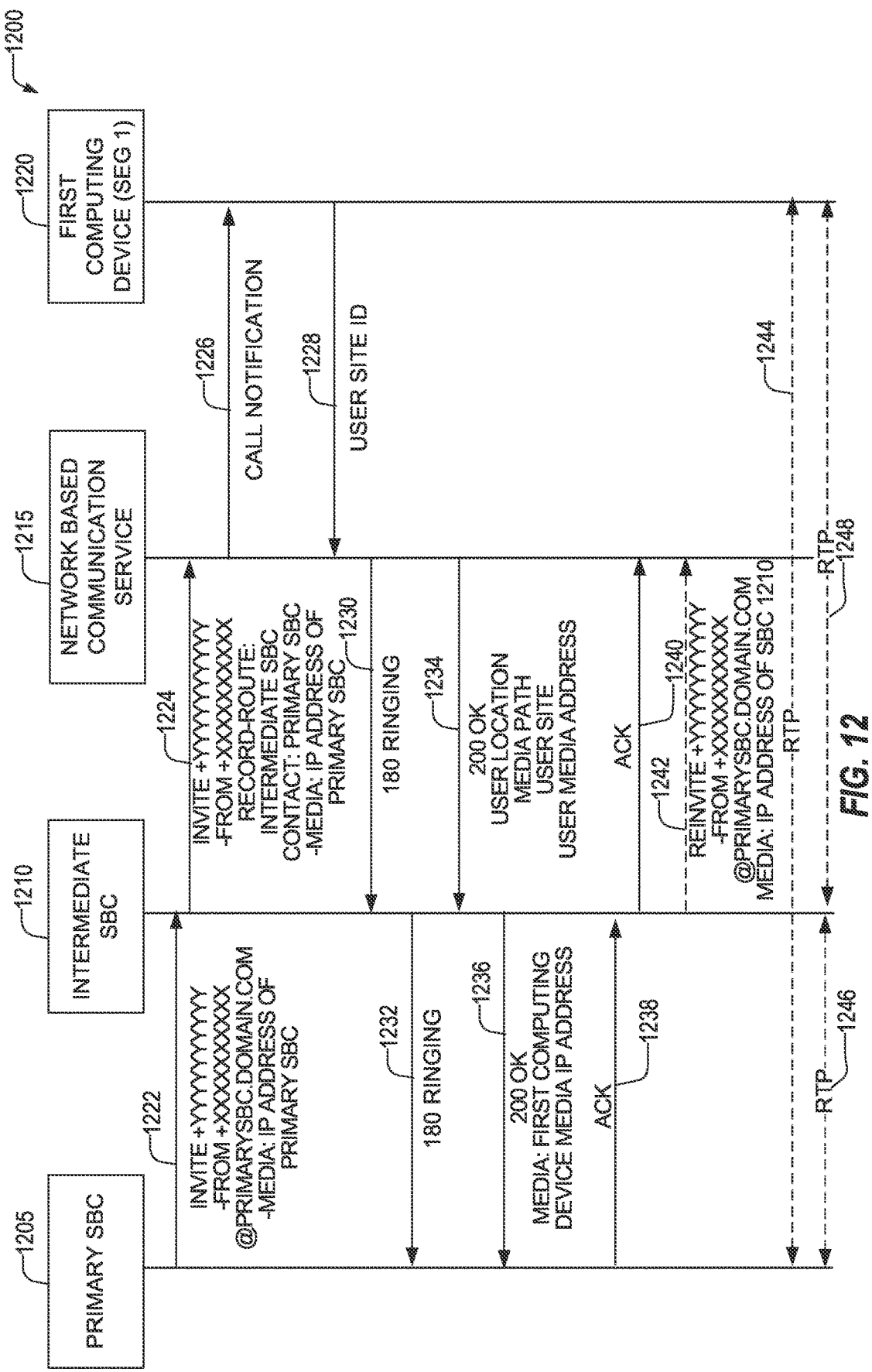
FIG. 12 illustrates a diagram of a SIP message flow for a communication session initiated by a second device through a telephone network to a first computing device associated with the network-based communication service according to some examples of the present disclosure.

FIG. 12 illustrates a diagram of a SIP message flow 1200 for a communication session initiated by a second device through a telephone network to a first computing device 1220 associated with the network-based communication service 1115 according to some examples of the present disclosure. Primary SBC 1205 receives a call request from a telephone network. The primary SBC 1205 may determine that the phone number of the called party (the first computing device 1220) corresponds to the network-based communication service 1215. In response, the primary SBC 1205 sends a SIP invite message 1222. The SIP invite message 1222 may include the phone number of the second device (calling device) and may have the domain (fully qualified domain—FQD) of the primary SBC 1205 appended to it along with the media address of the primary SBC 1205. The primary SBC 1205 may determine an intermediate SBC 1210 based upon settings of the organization. For example, the organization may have designated the intermediate SBC 1210 as the SBC that interfaces with the network-based communication service 1215.

Intermediate SBC 1210 may receive the SIP invite message 1222 and may generate SIP invite message 1224 to send to the network-based communication service 1215. Intermediate SBC 1210 may recognize that the message originated from primary SBC 1205 and is to be forwarded to the network-based communication service 1215 by examination of the SIP invite message 1222. In particular, the appending of the domain of the primary SBC 1205 in the "from" field. Additionally, the intermediate SBC 1210 may determine that the destination device (first computing device 1220) is associated with the network-based communication service 1215 based upon the TO: field and settings that identify computing device phone numbers that are associated with the network-based communication service 1215. The SIP invite message 1224 may strip the domain name of the primary SBC 1205 in the FROM field and insert it into the "Contact" field. The SIP invite message 1224 may include its domain name in the RECORD-ROUTE field. The media address remains that of primary SBC 1205.

Network-based communication service 1215 generates a call notification 1226. In response the first computing device 1220 sends the network-based communication service 1215 a message indicating a network site (e.g., a user site id) 1228. This message may identify a network site the user is currently connected to. This may be a "site" of an organization or may be external to the organization. In some examples, the "site" may be explicitly identified by the first computing device 1220, but in other examples, the site may be determined by the network-based communication service 1215 through an IP address look-up that matches IP addresses with network sites.

Network-based communication service 1215 sends a 180 ringing message 1230, which is forwarded by intermediate SBC 1210 as 180 ringing message 1232 to primary SBC 1205. Network-based communication service 1215 then sends a 200 OK message 1234 to intermediate SBC 1210. The OK message 1234 includes the first computing device's location, a media path, the network site of the user and the user's media address. The network-based communication service may determine the media path based upon one or more of the network location of the first computing device, the primary SBC (and in particular the network site of the primary SBC), and a media mode of the primary SBC. This message is then sent by the intermediate SBC 1210 as 200 OK message 1236 to primary SBC 1205. The OK message 1236 may only include the media address of the first computing device and not the user location, media path, and user segment. Acknowledgment messages 1238, and 1240 are then exchanged. In some examples, the network-based communication service 1215 then informs the first computing device 1220 of the media address of where to send the media.

In some examples, the intermediate SBC 1210, may not know exactly where the first computing device 1220 is located. By default, the SBC 1210 may send the message 1224 with an internal IP address (e.g., the first computing device 1220 may be either internal or external to the private network). If during the signaling negotiations, the SBC 1210 learns that the client computing device cannot be reached on an internal address, it sends a re-invite with an external IP address that the client computing device can reach. As such, a re-invite message 1242 may be sent with a public IP address.

An RTP session is then established to transfer the media. In examples in which the first computing device 1220 is located in a same private network site as the primary SBC 1205, the RTP session 1244 may be used which is a direct connection to the primary SBC 1205. In examples in which the first computing device 1220 is not in a same private network site as the primary SBC 1205 but within the same organization's private network, and the organization has a media path setting allowing bypass always mode, the RTP session 1244 may be used which is a direct connection to the primary SBC 1205. In examples in which the first computing device 1220 is not located in a same private network site as the primary SBC 1205 but within the organization's private network, and the organization has a media path setting requiring local only mode, the RTP sessions 1246 and 1248 may be used which sends media to the intermediate SBC 1210 which then forwards it to the primary SBC 1205. In examples in which the first computing device 1220 is in a site external to the organization's private network the RTP sessions 1246 and 1248 may be used which sends media to the intermediate SBC 1210 which then forwards it to the primary SBC 1205. In some examples two different RTP sessions are opened (e.g., a first session 1246 and a second session 1248), but in other examples, the intermediate SBC 1210 merely forwards the RTP messages.

Figure 13:
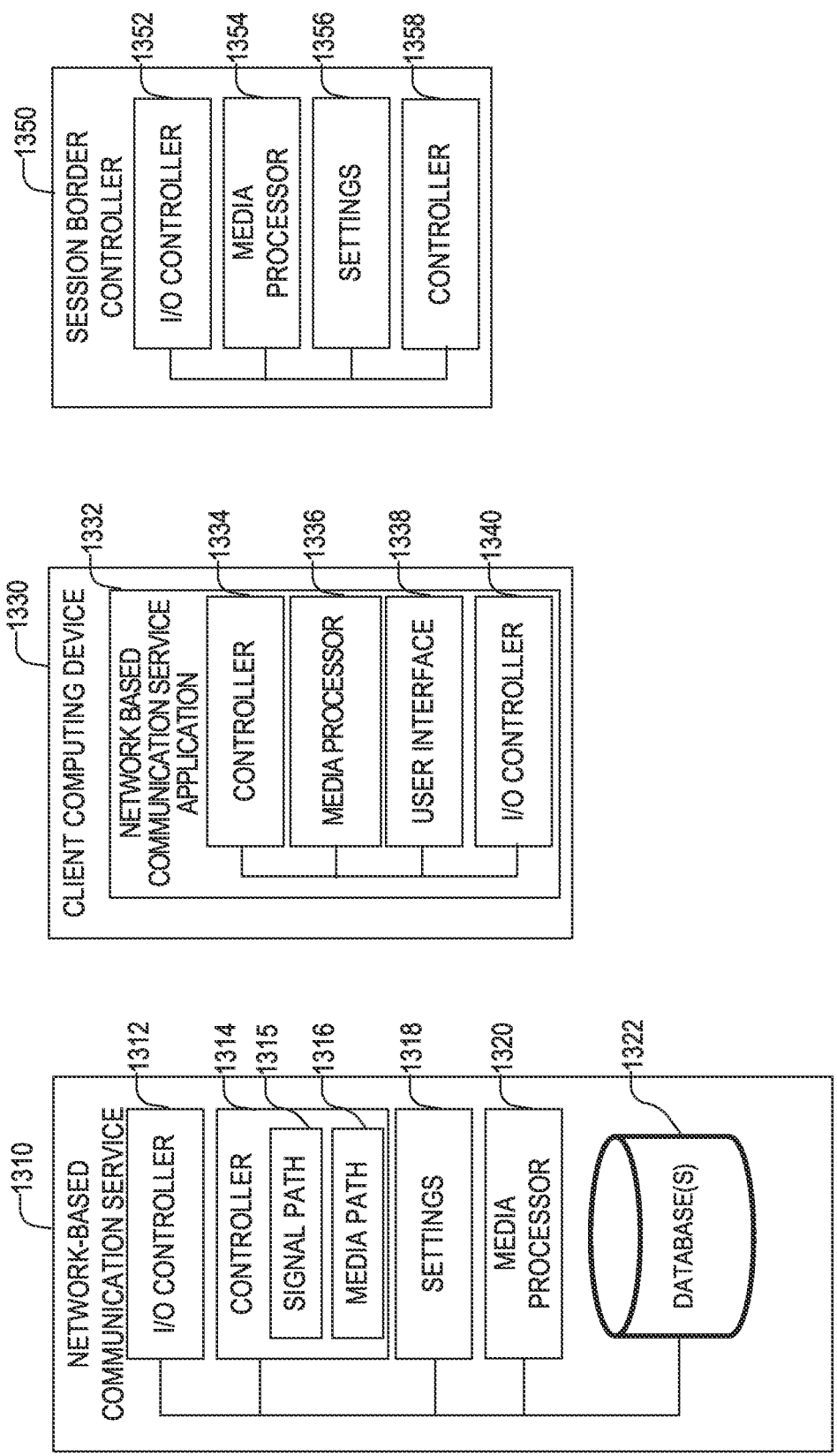
FIG. 13 illustrates a logical diagram of a network-based communication service, a client computing device, and a session border controller (SBC) according to some examples of the present disclosure.

FIG. 13 illustrates a logical diagram of a network-based communication service 1310, a client computing device 1330, and a session border controller (SBC) 1350 according to some examples of the present disclosure. Session border controller 1350 may take roles as either a primary or intermediate SBC. The logical components of network-based communication service 1310 may be implemented as software or hardware on one or more computing devices (e.g., servers), such as those shown in FIG. 17. Network-based communication service 1310 includes an I/O controller component 1312 which implements one or more interfaces to one or more client computing devices (such as client computing device 1330), to one or more SBCs (such as SBC 1350) and to one or more telephone network (e.g., PSTN) interfaces. I/O controller component 1312 implements one or more protocol stacks, such as a protocol stack based upon an OSI model, a Transmission Control Protocol/Internet Protocol (TCP/IP) model, or the like. Example protocols may include Transmission Control Protocol (TCP), Internet Protocol (IP), Real Time Transport Protocol (RTP), Session Initiation Protocol (SIP), Hypertext Transfer Protocol (HTTP), Representational State Transfer (REST), and the like.

Network-based communication service 1310 may include a controller 1314. Controller 1314 may setup and manage one or more communication sessions between one or more client computing devices 1330 and one or more other devices. For example, the controller 1314 may setup a call between two client computing devices associated with the network-based communication service. In other examples, the controller 1314 may setup a call between a client computing device and a device associated with a different communication system or network. This may include generating, receiving, processing, handling, and forwarding signaling and media (e.g., through the I/O controller component 1312) to and from client computing devices (such as client computing device 1330) and SBCs (such as SBC 1350) to provide a communication session.

Communication sessions may include voice, video, screen sharing, application sharing, or the like. Communication sessions may be two-party sessions in which two devices communicate, or may include multiple parties (e.g., more than two devices communicating)—for example, an online meeting. In some examples, the communication sessions may be real-time communication sessions in which media (such as voice, video, screen sharing data) is sent as it is captured by a capture device on the client computing device and/or other devices and consumed (e.g., played out) by other devices in the communication session once received. Controller 1314 may include a signal path component 1315 and media path component 1316 that may utilize settings, communication session information (e.g., phone numbers of the participants, network sites of the participants, and the like), and network information stored in database 1322 to determine a signal path and a media path as previously described.

Settings component 1318 provides one or more Graphical User Interface (GUI) descriptors to one or more computing devices of an administrator of the network-based communication service 1310 or an organization with an account with the network-based communication service 1310. GUI descriptors include one or more files that, when rendered by an application on the computing device of the administrator render one or more graphical user interfaces. GUI descriptors include one or more hypertext markup language (HTML), Cascading Style Sheets (CSS), scripting files (e.g., JavaScript), code modules (e.g., Java code), or the like. Settings component 1318 may allow administrators to define network sites, IP addresses belonging to those sites, SBCs that are reachable by the network-based communication service, SBCs that are not reachable and which reachable SBC to use to contact each SBC that is not reachable, call policies, media settings, and the like. In other examples, the settings component 1318 receives settings and changes using an API. For example, the administrator's computing device may have a command line interface that executes one or more commands that are sent through the API. These commands are processed by the settings component 1318. Settings may be saved in a data structure within the database 1322.

Media processing component 1320 may receive audio, video, screen sharing data, and the like and convert, transcode, packetize, process, or otherwise handle media. The media may be received from and sent to the client computing devices (such as client computing device 1330), session border controllers (such as SBCs 1350), telephone (e.g., PSTN) networks, and the like.

Client computing device 1330 may include a network-based communication service application 1332. Network-based communication service application 1332 may be an application which may interface with the network-based communication service and provide communications, such as voice, text, video, file sharing, and the like. Example network-based communication service applications may include MICROSOFT® TEAMS®, SKYPE®, SKYPE FOR BUSINESS®, or the like. The logical components of client computing device 1330 may be implemented as software or hardware on one or more computing devices (e.g., personal computers, tablets, smartphones, and the like), such as those shown in FIG. 17.

Network-based communication service application 1332 may include an I/O controller component 1340 which implements one or more interfaces to one or more network-based communication services (such as network-based communication service 1310) and to one or more SBCs (such as SBC 1350). I/O controller component 1340 implements one or more protocol stacks, such as a protocol stack according to an Open Systems Interconnect (OSI) model, a Transmission Control Protocol/Internet Protocol (TCP/IP) model, or the like. Example protocols may include TCP, IP, RTP, SIP, HTTP, REST, and the like. I/O controller component 1340 may also authenticate with the network-based communication service, register the location of the client computing device 1330 with the network-based communication service 1310, and the like.

Client computing device 1330 may include a controller 1334. Controller 1334 may setup and manage one or more communication sessions between the client computing device 1330 and one or more other devices (e.g., one or more other client computing devices or one or more devices such as a telephone) through network-based communication service (such as a network-based communication service 1310). As noted, the network-based communication service may utilize one or more SBCs (such as SBC 1350) to complete the communication. Controller 1334 may generate, receive, process, handle, and forwarding signaling and media (e.g., through the I/O controller component 1340) to and from the network-based communication service 1310 (such as network-based communication service 1310) and SBCs (such as SBC 1350) to provide a communication session. Controller 1334 may receive media from media processor component 1336 and cause that media to be sent in one or more packets over a network to other participants in the communication session.

Network-based communication service application 1332 may include a media processor component 1336. Media processor component 1336 may receive audio, video, screen sharing data, and the like and convert, transcode, packetize, process, or otherwise handle media. The media may be received from sensors of the client computing device 1330 (such as a microphone, video camera, or the like) and sent to other devices participating in the communication over the media path, such as by sending the media to the network-based communication service 1310, or one or more SBCs (such as SBC 1350). Media may also be received from session border controllers (such as SBCs 1350), network-based communication service 1310, and the like for playback on the client computing device 1330. The media may be played out on speakers, displays, and the like of the client computing device 1330 after receipt.

User interface 1338 may display media from the media processor component 1336 and may allow the user to enter text, select functions to allow the user to initiate a communication session, answer an incoming communication session request, change settings, and the like. In some examples, the user interface 1338 may allow users to select one or more media sources, including recording equipment such as microphones, video cameras, and the like. User interface 1338 may also allow the user to input one or more text communications, which may be sent as part of a communication session, including real-time communication sessions.

Session border controller (SBC) 1350 may be either an intermediate SBC or a destination SBC that processes a communication between the client computing device (e.g., client computing device 1330) and a second device and that interfaces with one or more servers of a network-based communication service (1310) to setup the communication. The logical components of SBC 1350 may be implemented as software or hardware on one or more computing devices (e.g., servers), such as those shown in FIG. 17. SBC 1350 may include an I/O controller component 1352 which implements one or more interfaces to one or more network-based communication services (such as network-based communication service 1310) and to one or more client computing devices (such as client computing device 1330). I/O controller component 1352 implements one or more protocol stacks, such as an OSI model protocol stack, a Transmission Control Protocol/Internet Protocol (TCP/IP) Stack, or the like. Example protocols may include TCP, IP, RTP, SIP, HTTP, REST, and the like.

SBC 1350 may include a controller 1358. Controller 1358 may setup and manage one or more communication sessions between one or more client computing devices 1330 and one or more other devices. This may include generating, receiving, processing, handling, and forwarding signaling and media (e.g., through the I/O controller component 1352) to and from client computing devices (such as client computing device 1330), telephone networks, and/or network-based communication services (such as network-based communication service 1310) to provide a communication session. Controller 1358 may provide one or more media IP addresses to which client computing device 1330 and/or network-based communication service 1310 sends media.

SBC 1350 may include a media processor component 1354. Media processor component 1354 may receive and send audio, video, screen sharing data, and the like and convert, transcode, packetize, process, or otherwise handle media. The media may be received from and provided to the client computing device (such as client computing device 1330), another session border controller, network-based communication service 1310, and the like. SBC 1350 may include a settings component 1356. Settings component may provide one or more GUI descriptors or provide an API for changing settings on the SBC. Settings may include media path options, such as bypass options.

As noted, the administrators of an organization may change the media path based upon one or more settings applied to one or more SBCs. Two media path settings were discussed—bypass only and local only. Additional settings may be used to introduce additional flexibility in media path flows for particular network structures. For example, an administrator may group one or more network sites into a network region. One or more network regions may be well connected to each other and media bypass may be used for communications between network sites in each region. An administrator may define a region link that represents two centralized SBCs that are connected to each other via a Wide Area Network (WAN). Furthermore, an even more granular control may be achieved where two network sites in different regions may have a good network link. In these examples, an administrator may create an inter-site policy that describes direct links between SBCs in two network sites.

Figure 14:
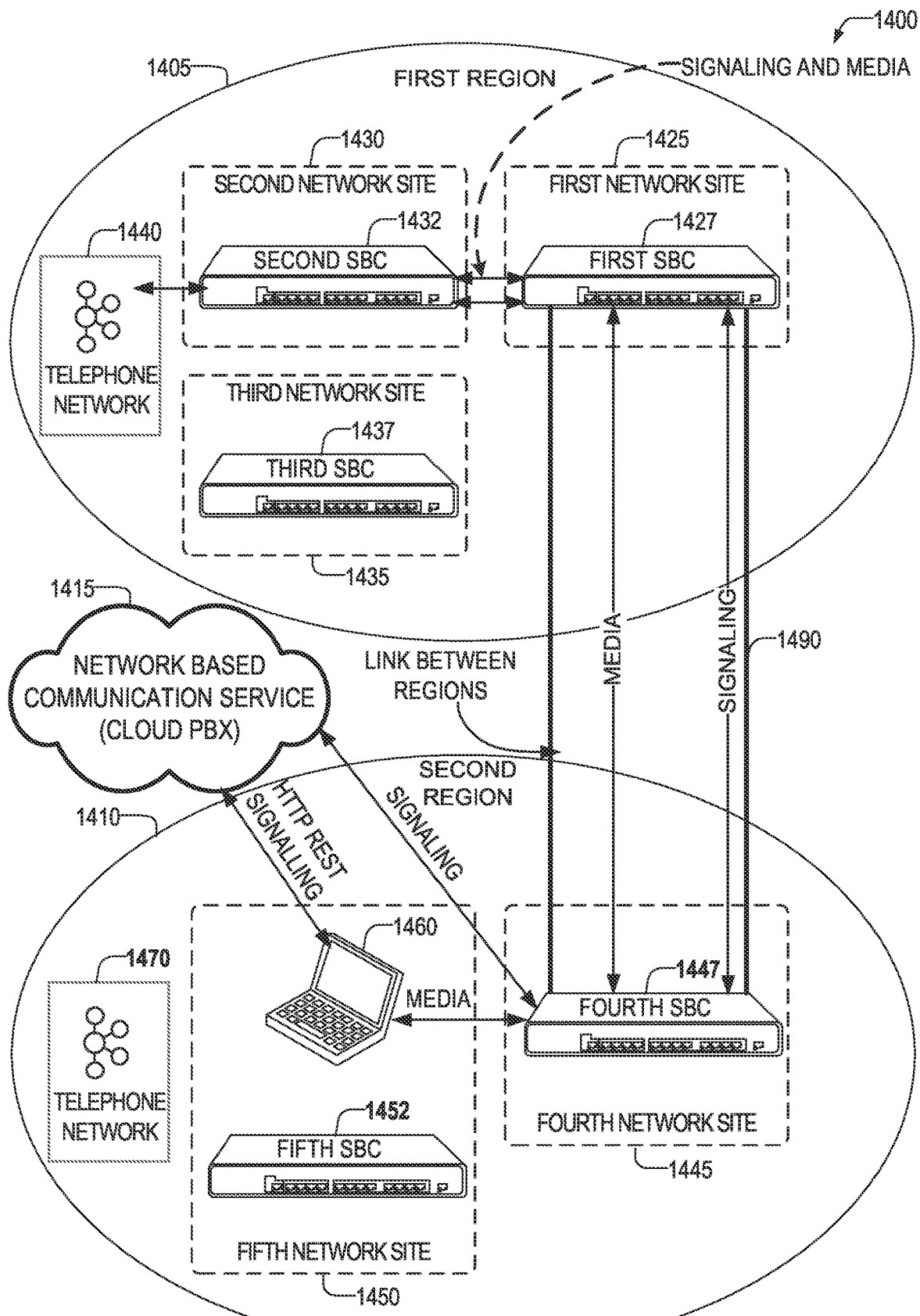
FIG. 14 illustrates a media flow for a communication session between a client computing device that is associated with the network-based communication service and a second device through a telephone network with media bypass between two regions with a region link according to some examples of the present disclosure.

FIG. 14 illustrates a media flow 1400 for a communication session between a client computing device that is associated with the network-based communication service and a second device through a telephone network with media bypass between two regions with a region link 1490 according to some examples of the present disclosure. An organizational network includes a first region 1405 and a second region 1410. First region 1405 includes a first network site 1425, a second network site 1430, and a third network site 1435. Each site includes an SBC, such as first SBC 1427, second SBC 1432, and third SBC 1437. First region 1405 also includes a connection to a telephone network 1440.

Second region 1410 includes a fourth network site 1445 with an associated fourth SBC 1447 and a fifth network site 1450 and a fifth SBC 1452. Second region 1410 also includes a connection to a telephone network 1470. In FIG. 14, there is region link 1490 that links a central SBC between the first and second regions. In the example of FIG. 14, the fourth SBC 1447 and the first SBC 1427 terminate the region link 1490. A client computing device 1460 in a network segment within the second region 1410 which participates in a communication session with another device that is to be routed across telephone network 1440 of the first region 1405 exchanges signaling with the network-based communication service 1415, which exchanges signaling with the fourth SBC 1447. Fourth SBC 1447 utilizes the region link 1490 to forward that signaling over to the first SBC 1427, which forwards the signaling to the second SBC 1432, which connects with the telephone network 1440. Media flows from the client computing device 1460 to the fourth SBC 1447, over the region link 1490, to the first SBC 1427, to the second SBC 1432 and the telephone network 1440.

Figure 15:
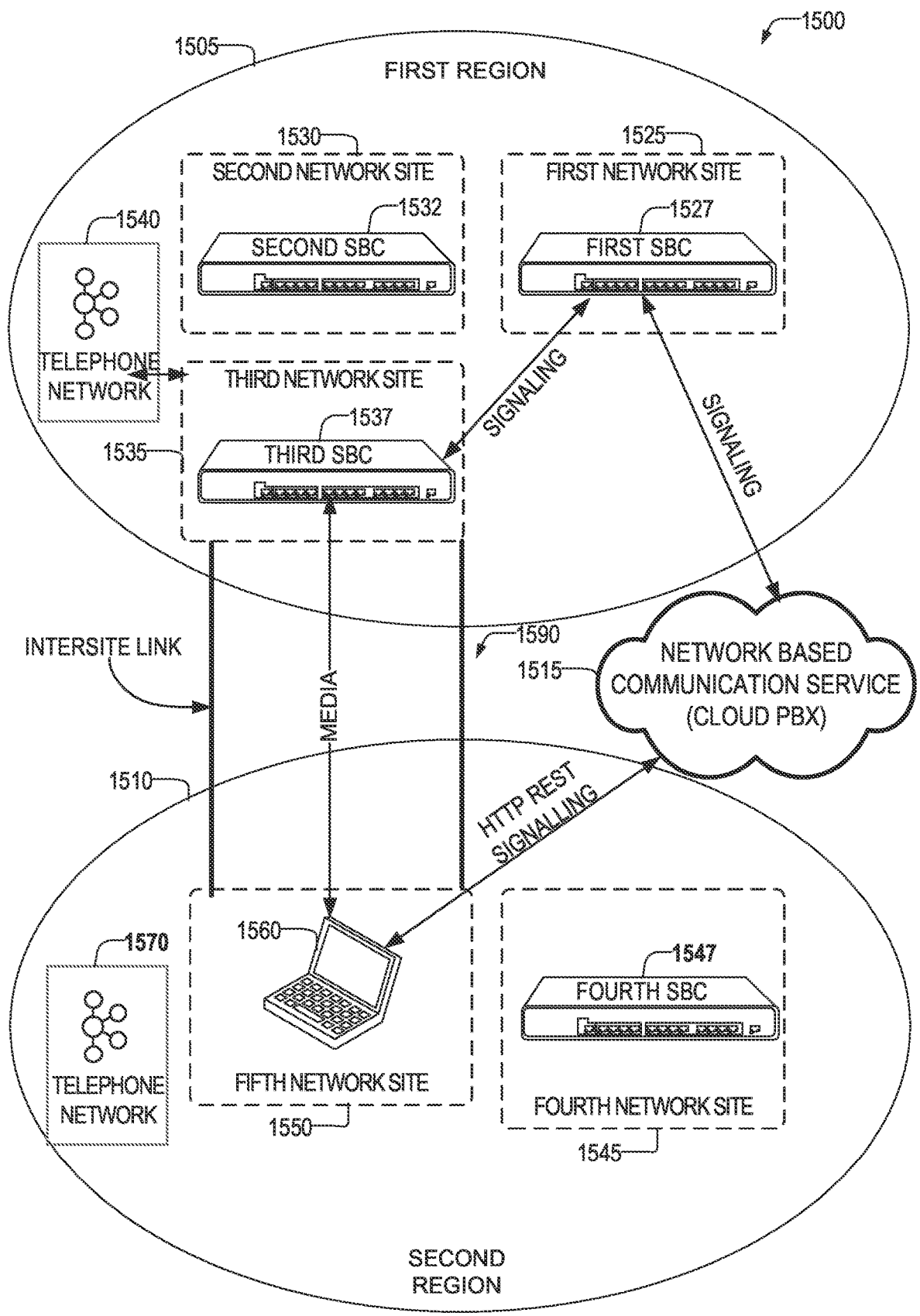
FIG. 15 illustrates a media flow for a communication session between a client computing device that is associated with the network-based communication service and a second device through a telephone network with media bypass between two regions with an intersite link according to some examples of the present disclosure.

FIG. 15 illustrates a media flow 1500 for a communication session between a client computing device that is associated with the network-based communication service and a second device through a telephone network with media bypass between two regions with an intersite link 1590 according to some examples of the present disclosure. The network includes a first region 1505 and a second region 1510. First region 1505 includes a first network site 1525, a second network site 1530, and a third network site 1535. Sites in FIG. 15 each includes an SBC, such as first SBC 1527, second SBC 1532, and third SBC 1537. First region 1505 also includes a connection to a telephone network 1540 and second region 1510 includes a link to telephone network 1570.

Second region 1510 includes a fourth network site 1545 with an associated fourth SBC 1547 and a fifth network site 1550. Second region 1510 also includes a connection to a telephone network 1570. In FIG. 15, there is an intersite link 1590 that links the fifth network site in the second region 1510 with the third network site 1535 in the first region 1505. A client computing device 1560 in the fifth site within the second region 1510 which makes or receives a communication which is to go out on the telephone network 1540 of the first region 1505 exchanges signaling with the network-based communication service 1515, which exchanges signaling with the first SBC 1527. First SBC 1527 forwards the signaling to the third network site 1535 which connects with the telephone network 1440. First SBC 1527 is the publicly addressable SBC within first region 1505 (e.g., third SBC 1537 and second SBC 1532 are not). Media flows from the client computing device 1560 to the third SBC 1537 over the intersite link 1590 and from the third SBC 1537 to the telephone network 1540. Similarly, if the client computing device 1560 was in the fourth network site 1545, the media could be routed over the fifth network site 1550 and across the intersite link 1590 to the third network site and third SBC 1537.

Figure 16:
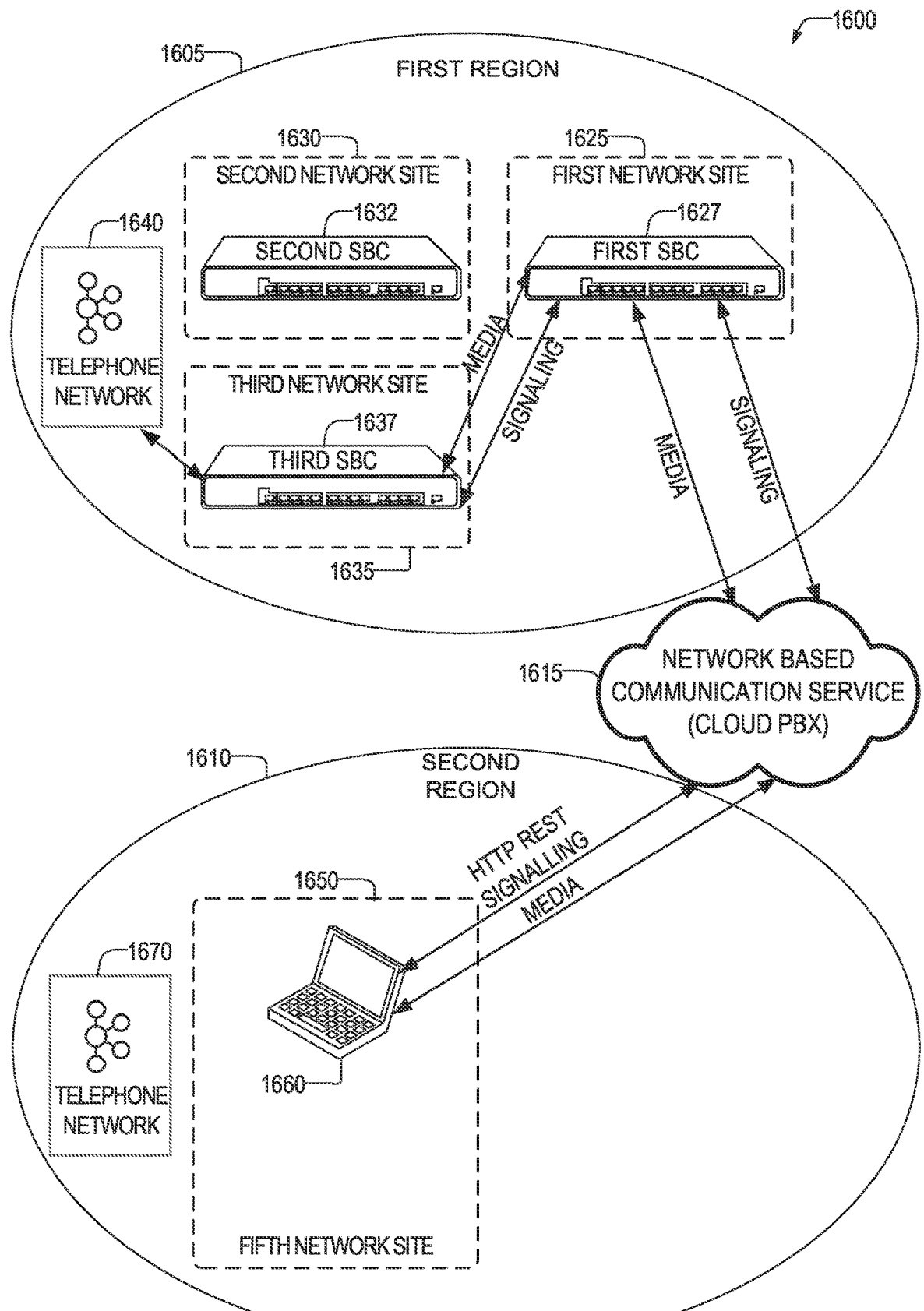
FIG. 16 illustrates a media flow for a communication session between a client computing device that is associated with the network-based communication service and a second device through a telephone network with media bypass between two regions without a region link or site link according to some examples of the present disclosure.

FIG. 16 illustrates a media flow 1600 for a communication session between a client computing device that is associated with the network-based communication service and a second device through a telephone network with media bypass between two regions without a region link or site link according to some examples of the present disclosure. An organizational network includes a first region 1605 and a second region 1610. First region 1605 includes a first network site 1625, a second network site 1630, and a third network site 1635. Each segment includes an SBC, such as first SBC 1627, second SBC 1632, and third SBC 1637. First region 1605 also includes a connection to a telephone network 1640.

Second region 1610 includes a fifth network site 1650. Second region 1410 also includes a connection to a telephone network 1670. In FIG. 16, there are no region links or intersite links. A client computing device 1660 in a segment within the second region 1610 which makes or receives a call which is to go out on the telephone network 1640 of the first region 1605 exchanges signaling with the network-based communication service 1615, which exchanges signaling with the first SBC 1627. First SBC 1627 forwards the signaling to the third SBC 1637, which connects with the telephone network 1640. Media flows from the client computing device 1660 to the network-based phone system 1615, to the first SBC 1627, third SBC 1637 and the telephone network 1640.

As described herein a phone number is used to identify various devices, such as the calling and called devices. Other identifiers may be utilized in a same fashion. For example, any unique identifier that allows the communication session to be routed to a particular user may be utilized. Other example identifiers include a SIP identifier (e.g., a SIP URI), International Mobile Subscriber Identity (IMSI), and the like.

As described herein, a client computing device is associated with a network-based communication service when it is registered to make and/or receive communications using the network-based communication service to setup those communications. Throughout the specification, the communication is shown as being routed over, and the primary SBC connected to, a telephone network. A telephone network may be a communications network that routes telephony traffic and may include a PSTN network, a cellular network, a satellite network, a terrestrial network, and/or the like. The telephone network may be digital and/or analog—for example, certain portions may be digital and certain portions may be analog, or the entire telephone network may be digital and the entire network may be analog. The telephone network may be packet switched in whole or in part and/or circuit switched in whole or in part. The telephone network may be cellular, satellite, terrestrial and/or the like. The network-based communication service, as previously noted, is provided by one or more computing devices, such as computer servers.

As noted, for communications originating with the client computing device, the network-based communication service may determine where to route the signaling for completing the communication based upon one or more of the phone number of the client computing device, the network location of the client computing device, or a phone number of the other party to the communication session. For example, the network-based communication service may use one of the above factors, some of the above factors, or all of the above factors. For example, the network-based communication service may use the phone number of the client computing device, the network location of the client computing device, and a phone number of the other party to the communication session.

Figure 17:
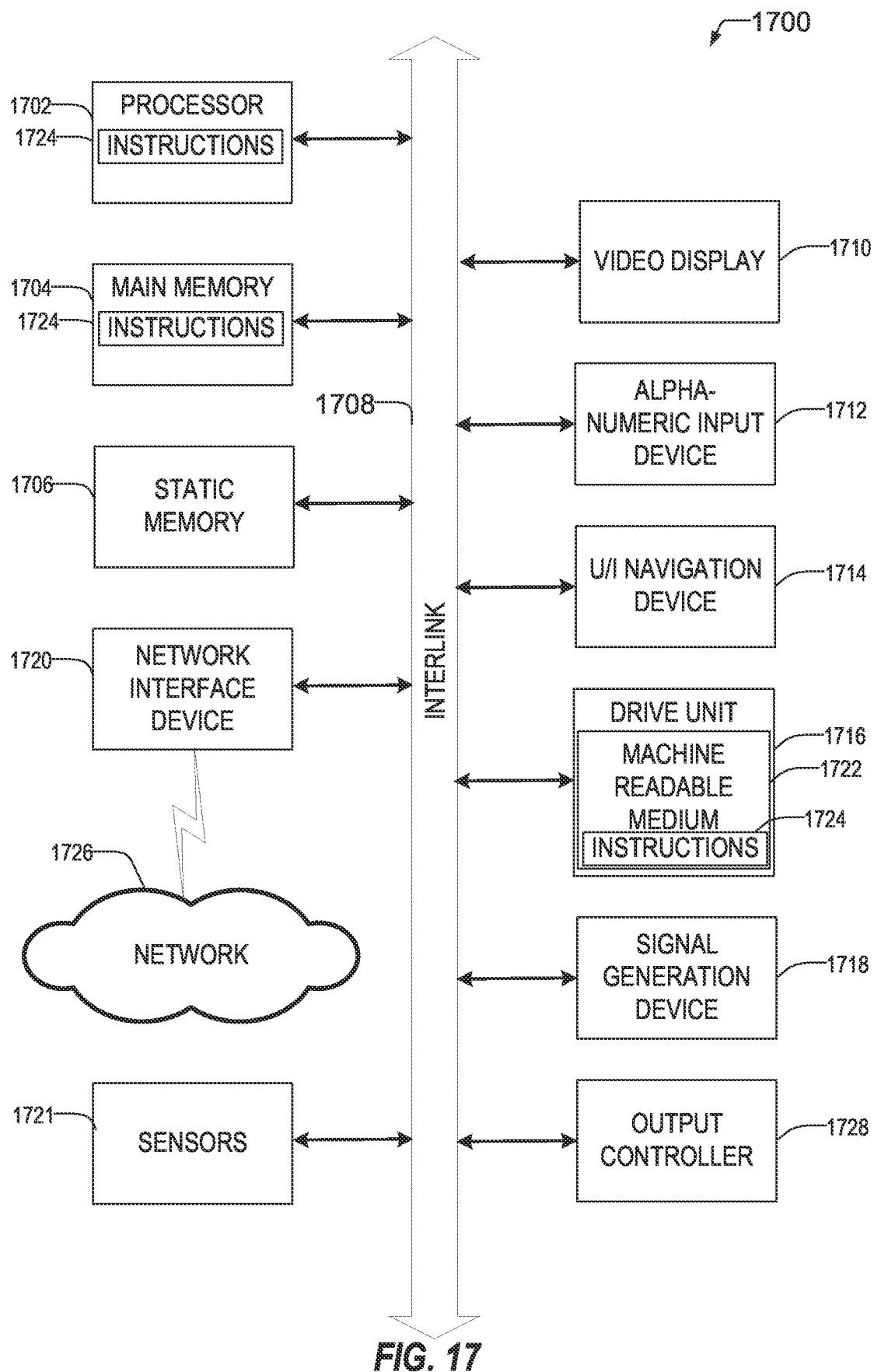
FIG. 17 is a block diagram illustrating an example of a machine upon which one or more embodiments may be implemented.

FIG. 17 illustrates a block diagram of an example machine 1700 upon which any one or more of the techniques (e.g., methodologies) discussed herein may perform. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a SBC, server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 1700 may be configured to implement the client computing devices, such as client computing devices 110, 210, 310, 410, 510, 1120, 1220, 1330, 1460, 1560, 1610. One or more machines such as machine 1700 may be configured to implement the network-based communications service, such as network-based communications service 120, 220, 320, 420, 520, 1115, 1215, 1310, 1415, 1515, 1615. One or more machines such as machine 1700 may be configured to implement the SBCs (either intermediate or primary SBCs), such as SBCs 130, 230, 235, 335, 330, 430, 435, 530, 535, 1105, 1110, 1205, 1210, 1350, 1427, 1432, 1437, 1447, 1452, 1527, 1532, 1537, 1547, 1627, 1632, and 1637. Additionally, machine 1700 may be configured to perform any other functions described herein or to implement any of the devices described herein including the second device. Additionally, machine 1700 may perform any of the methods of FIGS. 6-10 and implement the messaging flows of FIGS. 11 and 12. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal. In some examples, the machine-readable medium may be a non-transitory machine readable medium. The machine-readable medium may be a machine-readable storage device.

The instructions 1724 may further be transmitted or received over a communications network 1726 using a transmission medium via the network interface device 1720. The Machine 1700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. In some examples, the network interface device 1720 may wirelessly communicate using Multiple User MIMO techniques.

OTHER NOTES AND EXAMPLES

Example 1 is a computing device, for providing a network-based communication service, the device comprising: a processor; a memory, the memory storing instructions, which when executed, cause the processor to perform operations comprising: determining that a communication session is to be setup between a first computing device and a second device, the communication session routed partially over a telephone network; determining a network location where the first computing device is located; identifying a first session border controller (SBC) that is to interface with the telephone network during the communication session, wherein the first SBC is not reachable over a first network by the network-based communication service; identifying a second SBC which is reachable over the first network by the network-based communication service, the first SBC reachable by the second SBC over a second network; determining a media path for the communication session based upon a media path setting, the network location of the first computing device, and the first SBC, the media path including the first SBC; and causing establishment of the communication session by transmitting a signaling message between the network-based communication service and the first SBC through the second SBC, the signaling message instructing the first and second SBCs to use the media path.

In Example 2, the subject matter of Example 1 includes, wherein the communication session is a voice call.

In Example 3, the subject matter of Examples 1-2 includes, wherein the first SBC is located in a same network site as the first computing device and the media path setting indicates a local only mode or a bypass mode, wherein the operation of determining the media path comprises determining that the media path is from the first computing device to the first SBC without traversing through the second SBC.

In Example 4, the subject matter of Examples 1-3 includes, wherein the first SBC is not located in a same network site as the first computing device, the first computing device and the first SBC are on the second network, and the media path setting indicates a bypass mode, and wherein the operation of determining the media path comprises determining that the media path is from the first computing device to the first SBC without traversing through the second SBC.

In Example 5, the subject matter of Examples 1-4 includes, wherein the first SBC is not located in a same network site as the first computing device and the media path setting indicates a local only mode, and wherein the operation of determining the media path comprises determining that the media path is from the first computing device to the first SBC through the second SBC.

In Example 6, the subject matter of Examples 1-5 includes, wherein the network location is within the first network, and wherein the operation of determining the media path comprises determining that the media path is from the first computing device to the first SBC through the second SBC.

In Example 7, the subject matter of Examples 1-6 includes, wherein the operation of determining the network location comprises selecting a network site from a plurality of network sites based upon a network address of the first computing device.

In Example 8, the subject matter of Examples 1-7 includes, wherein the signaling message is a Session Initiation Protocol (SIP) invite or re-invite message.

In Example 9, the subject matter of Example 8 includes, wherein the signaling message comprises protocol extensions added to the SIP invite or re-invite message to instruct the second SBC to forward the signaling message to the first SBC and to use the media path.

In Example 10, the subject matter of Examples 1-9 includes, wherein the operation of determining that the communication session is to be setup between a first computing device and a second device comprises receiving an invite message from the second SBC, and wherein the operation of identifying the second SBC comprises determining a source of the invite message and wherein the operation of identifying the first SBC comprises identifying the first SBC from the invite message.

In Example 11, the subject matter of Examples 1-10 includes, wherein the operation of determining that the communication session is to be setup between a first computing device and a second device comprises receiving a call notification from the first computing device, and wherein the operation of identifying a first session border controller (SBC) to route the communication session comprises identifying the first SBC based upon a phone number of the second device.

In Example 12, the subject matter of Examples 1-11 includes, wherein the telephone network is a public switched telephone network (PSTN).

In Example 13, the subject matter of Examples 1-12 includes, wherein the telephone network is a cellular network.

Example 14 is a method for providing a network-based communication service, the method comprising: determining that a communication session is to be setup between a first computing device and a second device, the communication session routed partially over a telephone network; determining a network location where the first computing device is located; identifying a first session border controller (SBC) that is to interface with the telephone network during the communication session, wherein the first SBC is not reachable over a first network by the network-based communication service; identifying a second SBC which is reachable over the first network by the network-based communication service, the first SBC reachable by the second SBC over a second network; determining a media path for the communication session based upon a media path setting, the network location of the first computing device, and the first SBC, the media path including the first SBC; and causing establishment of the communication session by transmitting a signaling message between the network-based communication service and the first SBC through the second SBC, the signaling message instructing the first and second SBCs to use the media path.

In Example 15, the subject matter of Example 14 includes, wherein the communication session is a voice call.

In Example 16, the subject matter of Examples 14-15 includes, wherein the first SBC is located in a same network site as the first computing device and the media path setting indicates a local only mode or a bypass mode, wherein determining the media path comprises determining that the media path is from the first computing device to the first SBC without traversing through the second SBC.

In Example 17, the subject matter of Examples 14-16 includes, wherein the first SBC is not located in a same network site as the first computing device, the first computing device and the first SBC are on the second network, and the media path setting indicates a bypass mode, and wherein determining the media path comprises determining that the media path is from the first computing device to the first SBC without traversing through the second SBC.

In Example 18, the subject matter of Examples 14-17 includes, wherein the first SBC is not located in a same network site as the first computing device and the media path setting indicates a local only mode, and wherein determining the media path comprises determining that the media path is from the first computing device to the first SBC through the second SBC.

In Example 19, the subject matter of Examples 14-18 includes, wherein the network location is within the first network, and wherein determining the media path comprises determining that the media path is from the first computing device to the first SBC through the second SBC.

In Example 20, the subject matter of Examples 14-19 includes, wherein determining the network location comprises selecting a network site from a plurality of network sites based upon a network address of the first computing device.

In Example 21, the subject matter of Examples 14-20 includes, wherein the signaling message is a Session Initiation Protocol (SIP) invite or re-invite message.

In Example 22, the subject matter of Example 21 includes, wherein the signaling message comprises protocol extensions added to the SIP invite or re-invite message to instruct the second SBC to forward the signaling message to the first SBC and to use the media path.

In Example 23, the subject matter of Examples 14-22 includes, wherein determining that the communication session is to be setup between a first computing device and a second device comprises receiving an invite message from the second SBC, and wherein identifying the second SBC comprises determining a source of the invite message and wherein identifying the first SBC comprises identifying the first SBC from the invite message.

In Example 24, the subject matter of Examples 14-23 includes, wherein determining that the communication session is to be setup between a first computing device and a second device comprises receiving a call notification from the first computing device, and wherein identifying a first session border controller (SBC) to route the communication session comprises identifying the first SBC based upon a phone number of the second device.

In Example 25, the subject matter of Examples 14-24 includes, wherein the telephone network is a public switched telephone network (PSTN).

In Example 26, the subject matter of Examples 14-25 includes, wherein the telephone network is a cellular network.

Example 27 is a machine-readable medium, storing instructions for providing a network-based communication service, the instructions, when executed by a machine, causing the machine to perform operations comprising: determining that a communication session is to be setup between a first computing device and a second device, the communication session routed partially over a telephone network; determining a network location where the first computing device is located; identifying a first session border controller (SBC) that is to interface with the telephone network during the communication session, wherein the first SBC is not reachable over a first network by the network-based communication service; identifying a second SBC which is reachable over the first network by the network-based communication service, the first SBC reachable by the second SBC over a second network; determining a media path for the communication session based upon a media path setting, the network location of the first computing device, and the first SBC, the media path including the first SBC; and causing establishment of the communication session by transmitting a signaling message between the network-based communication service and the first SBC through the second SBC, the signaling message instructing the first and second SBCs to use the media path.

In Example 28, the subject matter of Example 27 includes, wherein the communication session is a voice call.

In Example 29, the subject matter of Examples 27-28 includes, wherein the first SBC is located in a same network site as the first computing device and the media path setting indicates a local only mode or a bypass mode, wherein the operation of determining the media path comprises determining that the media path is from the first computing device to the first SBC without traversing through the second SBC.

In Example 30, the subject matter of Examples 27-29 includes, wherein the first SBC is not located in a same network site as the first computing device, the first computing device and the first SBC are on the second network, and the media path setting indicates a bypass mode, and wherein the operation of determining the media path comprises determining that the media path is from the first computing device to the first SBC without traversing through the second SBC.

In Example 31, the subject matter of Examples 27-30 includes, wherein the first SBC is not located in a same network site as the first computing device and the media path setting indicates a local only mode, and wherein the operation of determining the media path comprises determining that the media path is from the first computing device to the first SBC through the second SBC.

In Example 32, the subject matter of Examples 27-31 includes, wherein the network location is within the first network, and wherein the operation of determining the media path comprises determining that the media path is from the first computing device to the first SBC through the second SBC.

In Example 33, the subject matter of Examples 27-32 includes, wherein the operation of determining the network location comprises selecting a network site from a plurality of network sites based upon a network address of the first computing device.

In Example 34, the subject matter of Examples 27-33 includes, wherein the signaling message is a Session Initiation Protocol (SIP) invite or re-invite message.

In Example 35, the subject matter of Example 34 includes, wherein the signaling message comprises protocol extensions added to the SIP invite or re-invite message to instruct the second SBC to forward the signaling message to the first SBC and to use the media path.

In Example 36, the subject matter of Examples 27-35 includes, wherein the operation of determining that the communication session is to be setup between a first computing device and a second device comprises receiving an invite message from the second SBC, and wherein the operation of identifying the second SBC comprises determining a source of the invite message and wherein the operation of identifying the first SBC comprises identifying the first SBC from the invite message.

In Example 37, the subject matter of Examples 27-36 includes, wherein the operation of determining that the communication session is to be setup between a first computing device and a second device comprises receiving a call notification from the first computing device, and wherein the operation of identifying a first session border controller (SBC) to route the communication session comprises identifying the first SBC based upon a phone number of the second device.

In Example 38, the subject matter of Examples 27-37 includes, wherein the telephone network is a public switched telephone network (PSTN).

In Example 39, the subject matter of Examples 27-38 includes, wherein the telephone network is a cellular network.

Example 40 is a device for providing a network-based communication service, the device comprising: means for determining that a communication session is to be setup between a first computing device and a second device, the communication session routed partially over a telephone network; means for determining a network location where the first computing device is located; means for identifying a first session border controller (SBC) that is to interface with the telephone network during the communication session, wherein the first SBC is not reachable over a first network by the network-based communication service; means for identifying a second SBC which is reachable over the first network by the network-based communication service, the first SBC reachable by the second SBC over a second network; means for determining a media path for the communication session based upon a media path setting, the network location of the first computing device, and the first SBC, the media path including the first SBC; and means for causing establishment of the communication session by transmitting a signaling message between the network-based communication service and the first SBC through the second SBC, the signaling message instructing the first and second SBCs to use the media path.

In Example 41, the subject matter of Example 40 includes, wherein the communication session is a voice call.

In Example 42, the subject matter of Examples 40-41 includes, wherein the first SBC is located in a same network site as the first computing device and the media path setting indicates a local only mode or a bypass mode, wherein the means for determining the media path comprises means for determining that the media path is from the first computing device to the first SBC without traversing through the second SBC.

In Example 43, the subject matter of Examples 40-42 includes, wherein the first SBC is not located in a same network site as the first computing device, the first computing device and the first SBC are on the second network, and the media path setting indicates a bypass mode, and wherein the means for determining the media path comprises means for determining that the media path is from the first computing device to the first SBC without traversing through the second SBC.

In Example 44, the subject matter of Examples 40-43 includes, wherein the first SBC is not located in a same network site as the first computing device and the media path setting indicates a local only mode, and wherein the means for determining the media path comprises means for determining that the media path is from the first computing device to the first SBC through the second SBC.

In Example 45, the subject matter of Examples 40-44 includes, wherein the network location is within the first network, and wherein the means for determining the media path comprises means for determining that the media path is from the first computing device to the first SBC through the second SBC.

In Example 46, the subject matter of Examples 40-45 includes, wherein the means for determining the network location comprises means for selecting a network site from a plurality of network sites based upon a network address of the first computing device.

In Example 47, the subject matter of Examples 40-46 includes, wherein the signaling message is a Session Initiation Protocol (SIP) invite or re-invite message.

In Example 48, the subject matter of Example 47 includes, wherein the signaling message comprises protocol extensions added to the SIP invite or re-invite message to instruct the second SBC to forward the signaling message to the first SBC and to use the media path.

In Example 49, the subject matter of Examples 40-48 includes, wherein the means for determining that the communication session is to be setup between a first computing device and a second device comprises means for receiving an invite message from the second SBC, and wherein the means for identifying the second SBC comprises means for determining a source of the invite message and wherein the means for identifying the first SBC comprises means for identifying the first SBC from the invite message.

In Example 50, the subject matter of Examples 40-49 includes, wherein the means for determining that the communication session is to be setup between a first computing device and a second device comprises means for receiving a call notification from the first computing device, and wherein the means for identifying a first session border controller (SBC) to route the communication session comprises means for identifying the first SBC based upon a phone number of the second device.

In Example 51, the subject matter of Examples 40-50 includes, wherein the telephone network is a public switched telephone network (PSTN).

In Example 52, the subject matter of Examples 40-51 includes, wherein the telephone network is a cellular network.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

What is claimed is:

1. A system for providing network-based communications, the system comprising:
   a network-based communication service, the network-based communication service comprising:
   a hardware processor;
   a memory, storing instructions, which when executed by the hardware processor, cause the network-based communication service to perform operations comprising:
   receiving, over a public packet-switched network, a request message from a first communications device within a first private network site of a first network region, the first network region comprising a grouping of a plurality of network sites, the request message requesting establishment of a communication session with a second communications device;
   responsive to receipt of the request message:
   determining a networklocation where the first communications device is located;
   based upon the network location and a communication number of the second communications device, identifying a first session border controller (SBC) in a first network site of a second network region, the first SBC connected to a Public Switched Telephone Network (PSTN) endpoint, the second network region comprising a second grouping of a plurality of network sites;
   identifying a second SBC in a second network site of the second network region, the first SBC reachable from the second SBC, and the second SBC reachable from the network-based communication service over the public packet- switched network;
   determining a media path for the communication session based upon a media path setting, the network location of the first communications device and the first SBC, the media path utilizing a private network link between the first private network site of the first network region and the first network site of the second network region and the PSTN;
   generating a signaling message configured to setup the communication session, the signaling message comprising a messaging field with instructions to the second SBC to forward the signaling message to the first SBC, the signaling message including instructions for the second SBC to use the media path; and
   causing establishment of the communication session by sending the signaling message to the second SBC, the signaling message instructing the second SBC to forward the signaling message to the first SBC, the signaling message instructing the first SBC to use the media path, the signaling message including a messaging field with the instructions to forward the signaling message to the first SBC and the media path.

2. The system of claim 1, wherein the communication session is a voice call.

3. The system of claim 1, wherein the signaling message is a session initiation protocol (SIP) invite or re-invite message and wherein the request message is a hypertext transfer protocol (HTTP) message.

4. The system of claim 1, wherein the signaling message comprises protocol extensions added to a SIP invite or re-invite message, and wherein the instructions to the second SBC to forward the signaling message to the first SBC are included in the protocol extensions.

5. The system of claim 1, wherein identifying the first session border controller (SBC) in the first network site of the second network region comprises identifying a setting indicating that communication sessions destined for a device within a region indicated by the network location of the first communications device are to be serviced using the PSTN endpoint.

6. The system of claim 1, further comprising:
   the second SBC, which is configured to perform operations comprising:
   receiving the signaling message;
   determining that the signaling message includes the messaging field with instructions to the second SBC to forward the signaling message to the first SBC; and
   responsive to determining that the signaling message includes the messaging field with instructions to the second SBC to forward the signaling message to the first SBC, forwarding the signaling message to the first SBC.

7. The system of claim 1, further comprising:
   the first communications device, which is configured to perform operations comprising:
   receiving a user input to initiate the communication session with the second communication device; and
   responsive to receiving the user input to initiate the communication session with the second communication device, creating the request message; and
   transmitting the request message to the network-based communication service.

8. A method for providing network-based communications, the method comprising:
   at a network-based communication service:
   receiving, over a public packet-switched network, a request message from a first communications device within a first private network site of a first network region, the first network region comprising a grouping of a plurality of network sites, the request message requesting establishment of a communication session with a second communications device;
   responsive to receipt of the request message:
   determining a networklocation where the first communications device is located;
   based upon the network location and a communication number of the second communications device, identifying a first session border controller (SBC) in a first network site of a second network region, the first SBC connected to a Public Switched Telephone Network (PSTN) endpoint, the second network region comprising a second grouping of a plurality of network sites;

identifying a second SBC in a second network site of the second network region, the first SBC reachable from the second SBC, and the second SBC reachable from the network-based communication service over the public packet- switched network;

determining a media path for the communication session based upon a media path setting, the network location of the first communications device and the first SBC, the media path utilizing a private network link between the first private network site of the first network region and the first network site of the second network region and the PSTN;

generating a signaling message configured to setup the communication session, the signaling message comprising a messaging field with instructions to the second SBC to forward the signaling message to the first SBC, the signaling message including instructions for the second SBC to use the media path; and causing establishment of the communication session by sending the signaling message to the second SBC, the signaling message instructing the second SBC to forward the signaling message to the first SBC, the signaling message instructing the first SBC to use the media path, the signaling message including a messaging field with the instructions to forward the signaling message to the first SBC and the media path.

9. The method of claim 8, wherein the communication session is a voice call.

10. The method of claim 8, wherein the signaling message is a session initiation protocol (SIP) invite or re-invite message and wherein the request message is a hypertext transfer protocol (HTTP) message.

11. The method of claim 8, wherein the signaling message comprises protocol extensions added to a SIP invite or re-invite message, and wherein the instructions to the second SBC to forward the signaling message to the first SBC are included in the protocol extensions.

12. The method of claim 8, wherein identifying the first session border controller (SBC) in the first network site of the second network region comprises identifying a setting indicating that communication sessions destined for a device within a region indicated by the network location of the first communications device are to be serviced using the PSTN endpoint.

13. The method of claim 8, further comprising:
at the second SBC:
receiving the signaling message;
determining that the signaling message includes the messaging field with instructions to the second SBC to forward the signaling message to the first SBC; and
responsive to determining that the signaling message includes the messaging field with instructions to the second SBC to forward the signaling message to the first SBC, forwarding the signaling message to the first SBC.

14. The method of claim 8, further comprising:
at the first communications device:
receiving a user input to initiate the communication session with the second communication device; and
responsive to receiving the user input to initiate the communication session with the second communication device, creating the request message; and
transmitting the request message to the network-based communication service.

15. A non-transitory machine-readable medium, storing instructions for providing network-based communications, the instructions, when executed by a network-based communication service, cause the network-based communication service to perform operations comprising:

receiving, over a public packet-switched network, a request message from a first communications device within a first private network site of a first network region, the first network region comprising a grouping of a plurality of network sites, the request message requesting establishment of a communication session with a second communications device;

responsive to receipt of the request message:
determining a network location where the first communications device is located;

based upon the network location and a communication number of the second communications device, identifying a first session border controller (SBC) in a first network site of a second network region, the first SBC connected to a Public Switched Telephone Network (PSTN) endpoint, the second network region comprising a second grouping of a plurality of network sites;

identifying a second SBC in a second network site of the second network region, the first SBC reachable from the second SBC, and the second SBC reachable from the network-based communication service over the public packet- switched network;

determining a media path for the communication session based upon a media path setting, the network location of the first communications device and the first SBC, the media path utilizing a private network link between the first private network site of the first network region and the first network site of the second network region and the PSTN;

generating a signaling message configured to setup the communication session, the signaling message comprising a messaging field with instructions to the second SBC to forward the signaling message to the first SBC, the signaling message including instructions for the second SBC to use the media path; and causing establishment of the communication session by sending the signaling message to the second SBC, the signaling message instructing the second SBC to forward the signaling message to the first SBC, the signaling message instructing the first SBC to use the media path, the signaling message including a messaging field with the instructions to forward the signaling message to the first SBC and the media path.

16. The non-transitory machine-readable medium of claim 15, wherein the communication session is a voice call.

17. The machine readable storage device non- transitory machine-readable medium of claim 15, wherein the signaling message is a session initiation protocol (SIP) invite or re-invite message and wherein the request message is a hypertext transfer protocol (HTTP) message.

18. The non-transitory machine-readable medium of claim 15, wherein the signaling message comprises protocol extensions added to a SIP invite or re-invite message, and wherein the instructions to the second SBC to forward the signaling message to the first SBC are included in the protocol extensions.

19. The non-transitory machine-readable medium of claim 15, wherein the operations of identifying the first session border controller (SBC) in the first network site of the second network region comprises identifying a setting indicating that communication sessions destined for a device within a region indicated by the networklocation of the first communications device are to be serviced using the PSTN endpoint.

20. The non-transitory machine-readable medium of claim 15, further comprising instructions, which when executed at the second SBC, cause the second SBC to perform operations comprising:

receiving the signaling message;

determining that the signaling message includes the messaging field with instructions to the second SBC to forward the signaling message to the first SBC; and responsive to determining that the signaling message includes the messaging field with instructions to the second SBC to forward the signaling message to the first SBC, forwarding the signaling message to the first SBC.

* * * * *